(12) United States Patent
Slimp, Jr. et al.

(10) Patent No.: US 12,480,661 B2
(45) Date of Patent: *Nov. 25, 2025

(54) PORTABLE HEATING DEVICE

(71) Applicant: Kyote Fire, LLC, Denver, CO (US)

(72) Inventors: Thomas Randall Slimp, Jr., Denver, CO (US); Nicholas Kirchner, Denver, CO (US); Kelly Lund, Lakewood, CO (US); Alex Tenenbaum, Belgrade, MT (US); Diego Horna, Miami, FL (US)

(73) Assignee: KYOTE FIRE, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,216

(22) Filed: Apr. 15, 2024

(65) Prior Publication Data
US 2024/0369228 A1 Nov. 7, 2024

Related U.S. Application Data

(63) Continuation of application No. 18/329,917, filed on Jun. 6, 2023, now Pat. No. 11,959,645.

(60) Provisional application No. 63/365,920, filed on Jun. 6, 2022.

(51) Int. Cl.
*F24C 3/02* (2021.01)
*F24C 3/12* (2006.01)
*F24C 15/24* (2006.01)
*F23D 14/12* (2006.01)

(52) U.S. Cl.
CPC .............. *F24C 3/022* (2013.01); *F24C 3/122* (2013.01); *F24C 15/24* (2013.01); *F23D 14/12* (2013.01)

(58) Field of Classification Search
CPC .......... F24C 3/022; F24C 3/122; F24C 15/24; F23D 14/12
See application file for complete search history.

(56) References Cited

U.S. PATENT DOCUMENTS

| | | | |
|---|---|---|---|
| 1,526,123 | A | 2/1925 | Du |
| D183,341 | S | 8/1958 | Chiascione |
| 3,980,069 | A | 9/1976 | Butlak et al. |
| 4,773,390 | A | 9/1988 | Watts |
| 5,749,356 | A | 5/1998 | Mandeville et al. |
| 6,065,467 | A | 5/2000 | Martin |
| 7,328,697 | B2 | 2/2008 | Turner et al. |
| 7,874,835 | B2 | 1/2011 | Schwank et al. |
| D685,601 | S | 7/2013 | Morabito |
| 8,851,062 | B2 | 10/2014 | Cedar et al. |
| 9,303,880 | B1 | 4/2016 | Tomlinson et al. |
| D760,880 | S | 7/2016 | Jenkins |
| 10,759,646 | B2 | 9/2020 | Jarisch et al. |

(Continued)

FOREIGN PATENT DOCUMENTS

KR 10-0539830 B1 6/2004

*Primary Examiner* — Alfred Basichas
(74) *Attorney, Agent, or Firm* — FisherBroyles, LLP; Craig W. Mueller

(57) ABSTRACT

A portable heating device is provided that generally consists of an upper housing having a plurality of openings that allow heat to escape from a coiled infrared heating tube that generates radiant heat. The portable heating device also includes an upper surface with an opening that produces a visible flame and conductive heat. The upper surface is also associated with a flame burner that feeds a cooking surface.

16 Claims, 26 Drawing Sheets

(56) References Cited

U.S. PATENT DOCUMENTS

| | | |
|---|---|---|
| D968,868 S | 11/2022 | Xia |
| D976,048 S | 1/2023 | Sullivan |
| 11,959,645 B2 * | 4/2024 | Slimp, Jr. ............... F24C 3/042 |
| 2008/0213715 A1 | 9/2008 | Stephens et al. |
| 2011/0079218 A1 | 4/2011 | Wortman |
| 2012/0208138 A1 | 8/2012 | Wortman et al. |
| 2014/0076307 A1 | 3/2014 | Boehm |
| 2018/0195732 A1 | 7/2018 | Drummond et al. |

* cited by examiner

PORTABLE HEATING DEVICE

This application is a continuation of U.S. patent application Ser. No. 18/329,917, filed Jun. 6, 2023, now U.S. Pat. No. 11,959,645, which claims the benefit of U.S. Provisional Patent Application Ser. No. 63/365,920, filed Jun. 6, 2022, the entireties of which are incorporated by reference herein.

This application is also related to U.S. Provisional Patent Application Ser. No. 63/268,805, which is incorporated by reference herein.

FIELD OF THE INVENTION

Embodiments of the present invention are generally related to portable heating devices that provide radiant and convective heat.

BACKGROUND OF THE INVENTION

A central component of the camping experience is a campfire. However, due to the growing devastation of climate-change-related wildfires, government agencies in many areas prohibit campers from enjoying traditional wood-burning campfires. This is especially true in North America's National Forests. The hot coals from wood-burning fires generate radiant heat waves that travel through the air much like the sun's rays. Energy is dissipated from heat waves when they strike solid objects, which is why standing near a wood-burning fire makes one feel warmer.

Thus, many campers have turned to often-permitted liquid-fueled fire pits. Current liquid-fueled fire pits offer campers some of the feel of a traditional wood-burning fire but lack the warming effects thereof. One problem with many currently available liquid-fueled fire pits is that they are designed to deliver convective heat instead of radiant heat. Traditional liquid-fueled fire pits burn propane to create a flame, which releases hot exhaust gas. This hot exhaust gas provides little warmth to those in an unenclosed, outdoor environment because warm air rises. If campers use currently available liquid-fueled fire pits in adverse weather conditions like wind or snow, their convective warming effects are further degraded.

A second major disadvantage to currently available liquid-fueled fire pits is the safety hazard of carrying large, heavy, irregularly shaped objects associated with the pit in a passenger vehicle on a highway or off-road. Campers often must travel along rough and bumpy forest service, BLM, or logging roads to a desired camping location. Suppose the vehicle's speed or direction changes rapidly, as is common in off-road travel and vehicular accidents. In that case, any loose object inside the vehicle becomes a projectile, potentially injuring the vehicle's occupants.

Thus, it is desirable to provide a portable liquid-fueled fire pit for camping that provides both the ambiance and heat output of a traditional wood-burning fire while also being adapted to be securely stored in or on the camper's vehicle during highway and off-road trips.

SUMMARY OF THE INVENTION

The contemplated portable heating device of one embodiment of the present invention is a combination infrared tube heater that provides radiant heat and a live flame that provides convective heat. Thus, one feature of embodiments of the inventions described herein that distinguishes them from small cookstoves and other portable heaters is that the contemplated portable heating devices produce a visible flame that emits additional heat and provides a campfire-like ambiance. Other features of embodiments of the present invention include one or more of the aspects/features described below.

Heating Characteristics. Embodiments of the present invention employ an infrared heating system comprised of a radiant heat-producing heating tube. At least one heat reflector is provided adjacent to the heating tube for directing the radiant heat in a predetermined fashion. The reflector may be selectively alterable and/or removable to suit the user's desires. The infrared heating system of one embodiment employs natural aspiration via a pressurized fuel jet that draws atmospheric air into a venturi and creates an air-fuel mixture that is combusted. The fuel jet also creates momentum that directs the hot gasses through the heating tube, which may also use turbulators to increase heat transfer to tube walls. The heat tube then glows and produces electromagnetic radiation in both the visible and infrared spectrum.

Decreased Envelope. At least one curled infrared tube is provided to radiate heat from multiple sides of the device instead of a substantially linear pipe, the common infrared tube heater construction. The burner is integrated within the infrared tube heater instead of being in a separate, interconnected component. One of ordinary skill in the art will appreciate that common infrared tube heaters separate the burner from the heating tube.

Transportability. The decreased envelope described above allows the heating device of some embodiments of the present invention to be stored and/or transported with its fuel source on or off-road in a vehicle. Alternatively, embodiments of the present invention are configured to selectively and securely interconnect to exterior or interior vehicle mounts such as tiedown points.

Configurability. Some embodiments of the present invention are modular, wherein components may be disassembled for transportation/storage, cleaning, or selective modification. For example, some embodiments include a configurable and replaceable upper plate, which will be described in further detail below. The upper plate may be selectively changed from one with at least one hole, to one with a plurality of holes, to a cooking grate, etc.

Primary Air Combustion. One embodiment of the present invention employs a heating element that relies only on primary air to complete combustion that feeds the heating tubes that emit infrared heat. Because this heating element does not use secondary air after the ignition of the fuel to complete the combustion, it is substantially unaffected by wind, air momentum, and air density. Accordingly, the system operates identically from the highest altitudes in the contiguous U.S. to sea level.

Fuel. Embodiments of the present invention use propane fuel. However, those of ordinary skill in the art will appreciate that other fuel sources may be used without departing from the scope of the invention. The fuel source may be a small propane bottle, commonly used with outdoor gas grills to increase portability. Of course, larger tanks can be used, increasing the time the portable heating device generates heat. Some embodiments of the present invention are configured to interconnect with municipal gas supplies or onsite tanks commonly found in rural areas. For example, embodiments of the present invention can be used at a home instead of constructing an expensive outdoor fire pit. Because the contemplated portable heater will use clean-burning fuel in a contained fashion, such a permanent or semi-permanent installation should comply with most municipal fire ordinances.

Cooking Surface. As will be appreciated upon review of the figures provided herewith, infrared heat emanating from the heating tube is specifically designed to be reflected outwardly from the portable heating device to warm individuals around the device. However, some of this heat may also be used to cook or heat previously cooked items through radiant (broiling) means. The upper plate of some embodiments of the invention has an opening from which a flame from the heating tube or a secondary source escapes. The flame can also be used for cooking, wherein a barbecue-style grate is provided across the opening. Armatures can also be provided for suspending cook pots above the flame. A grease trap may be provided around the heating tube outlet to catch grease, melted marshmallows, etc.

Durability. Because embodiments of the present invention are intended to be used outdoors, the components thereof are water-resistant or waterproof and durable enough to handle adverse weather or impacts from hail or heavy rain. Indeed, embodiments of the present invention are designed to be washed with the power washer because delicate components are shielded. For example, rain slits, rain gutters, scuppers, and drainage angles have been employed in one embodiment of the device to allow the heating element and decorative flame to burn in heavy rain. Additionally, a windshield allows the user to light and maintain a fire in high winds, heavy snow, and heavy rain.

Burner. Some embodiments of the present invention may employ features and aspects described in U.S. Patent Application Publication No. 2008/0213715 to Stephens et al. ("Stephens"), which is incorporated by reference herein, to enhance operations at high altitudes. More specifically, the contemplated burner of some embodiments of the present invention employs multiple fuel gas injectors that introduce a fuel/air mixture to a burner through multiple mixing tubes, wherein approximately 1-6% more oxidizer than necessary for stoichiometric combustion is entrained into the feed gas. Using the Stephens burner system also minimizes NOx and CO production. Further, higher heat transfer rates can be obtained if the combustion gases are driven at elevated pressures (forced convection) as described in U.S. Pat. Nos. 4,773,390 and 5,749,356.

One of ordinary skill in the art will appreciate that embodiments of the present invention may employ all or a select few of these aspects and features.

The Summary of the Invention is neither intended nor should it be construed as being representative of the full extent and scope of the present invention. That is, these and other aspects and advantages will be apparent from the disclosure of the invention(s) described herein. Further, the above-described embodiments, aspects, objectives, and configurations are neither complete nor exhaustive. As will be appreciated, other embodiments of the invention are possible using, alone or in combination, one or more of the features set forth above or described below. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present invention are possible utilizing, alone or in combination, as set forth above and/or described in the accompanying figures and/or in the description herein below.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and drawing figures are to be understood as being approximations which may be modified in all instances as required for a particular application of the novel assembly and method described herein.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112 (f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description and in the appended drawing figures.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
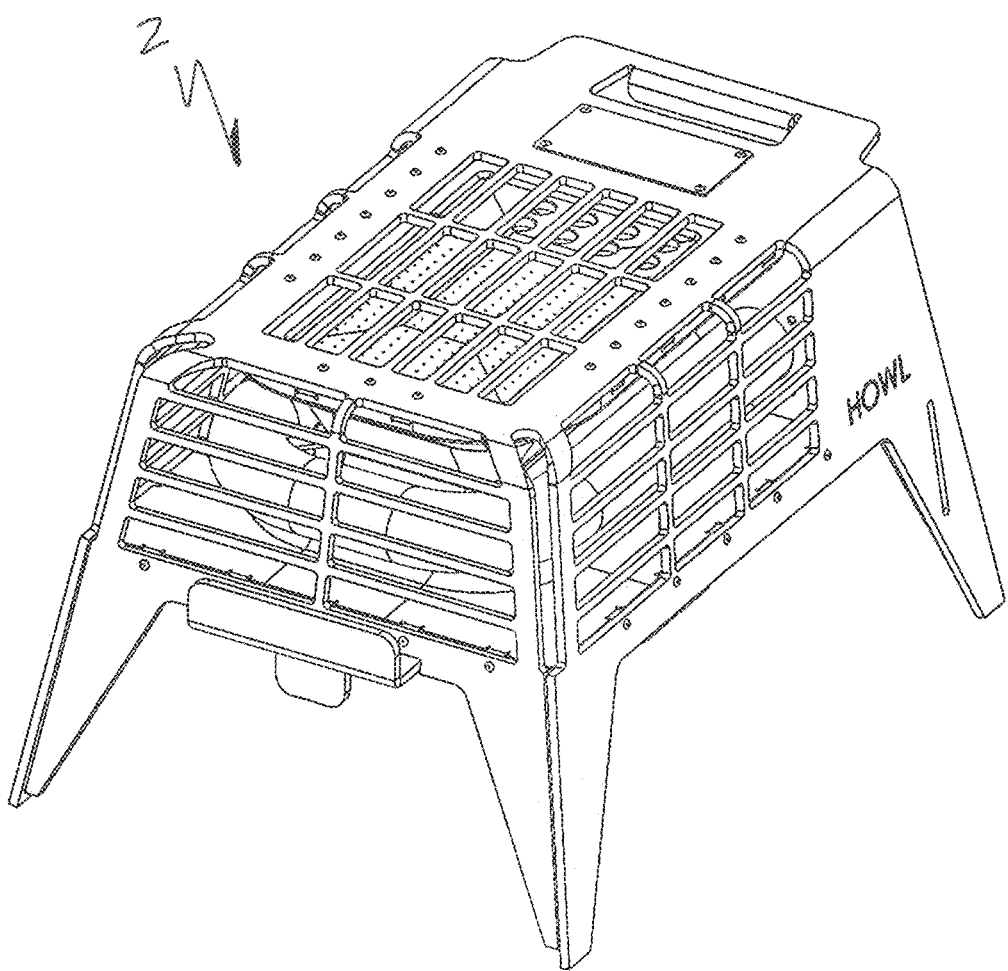
FIG. 1 is a front perspective view of a portable heating device of one embodiment of the present invention.
Figure 2:
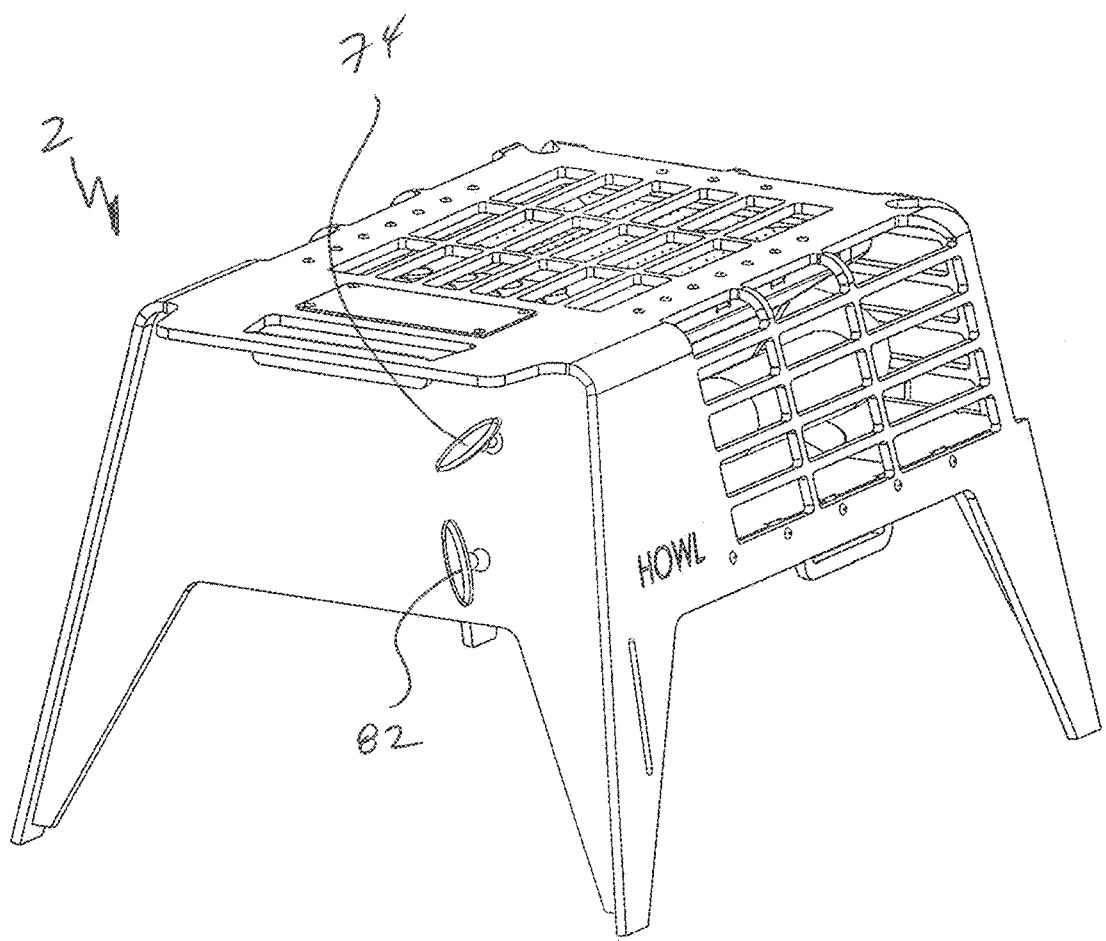
FIG. 2 is a rear perspective view of the portable heating device shown in FIG. 1.
Figure 3:
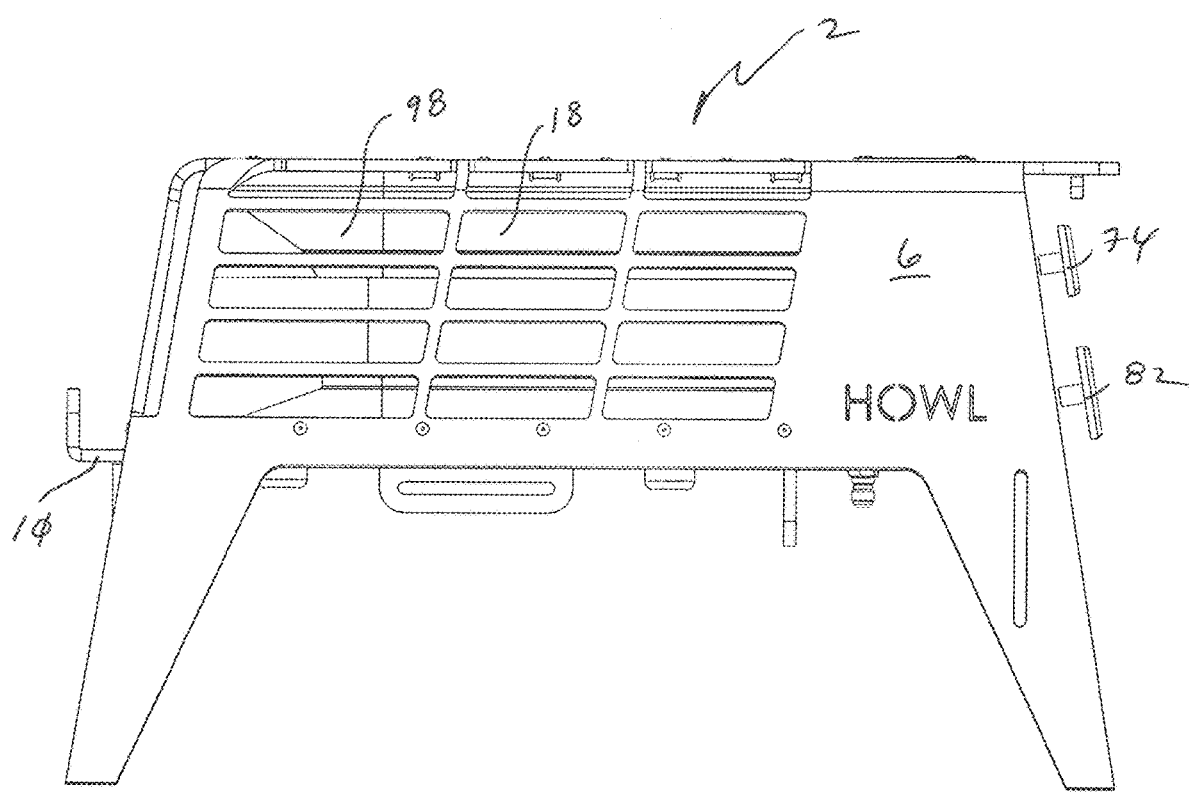
FIG. 3 is a right elevation view of the embodiment shown in FIG. 1.
Figure 4:
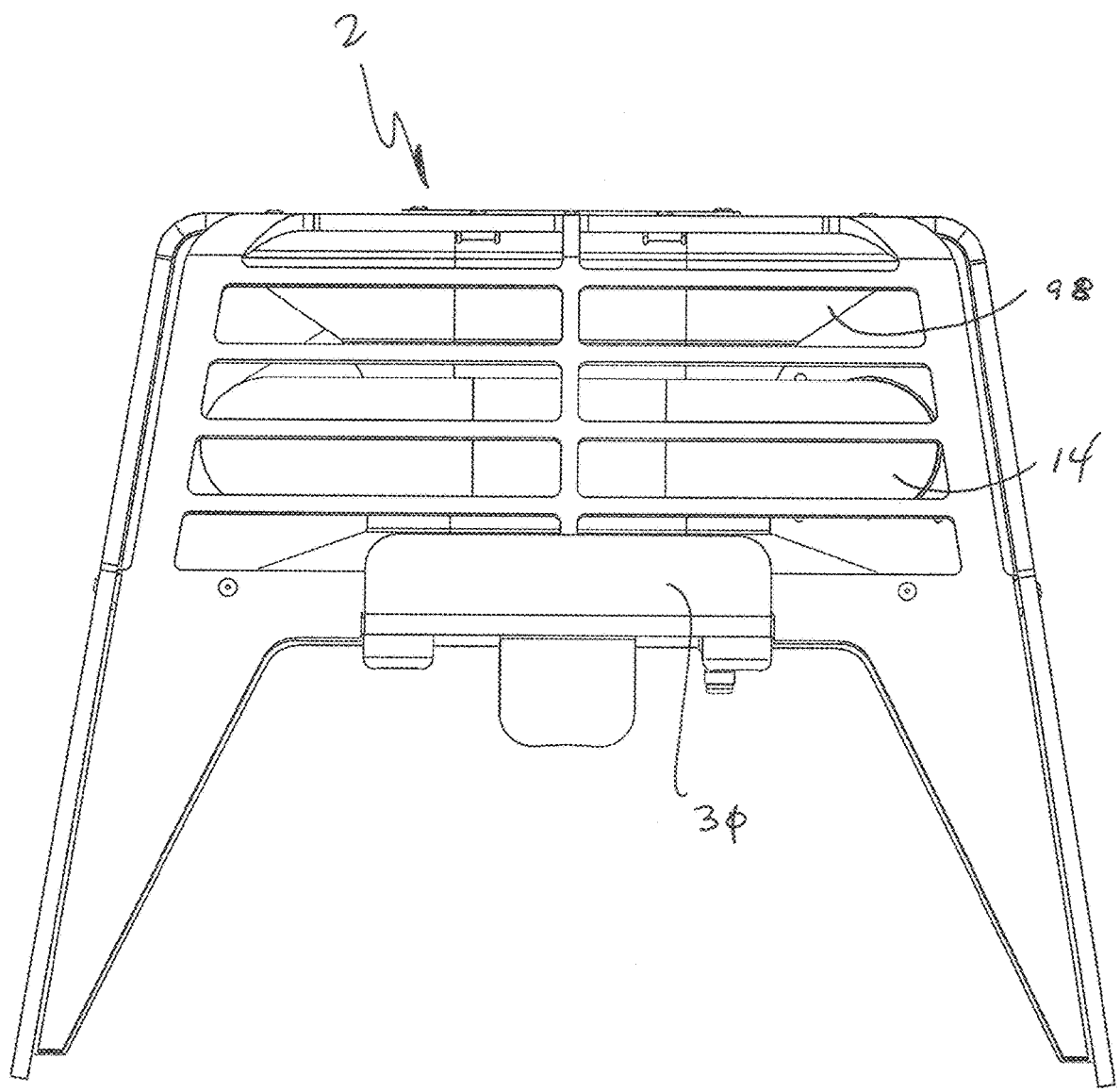
FIG. 4 is a front elevation view of the embodiment shown in FIG. 1.
Figure 5:
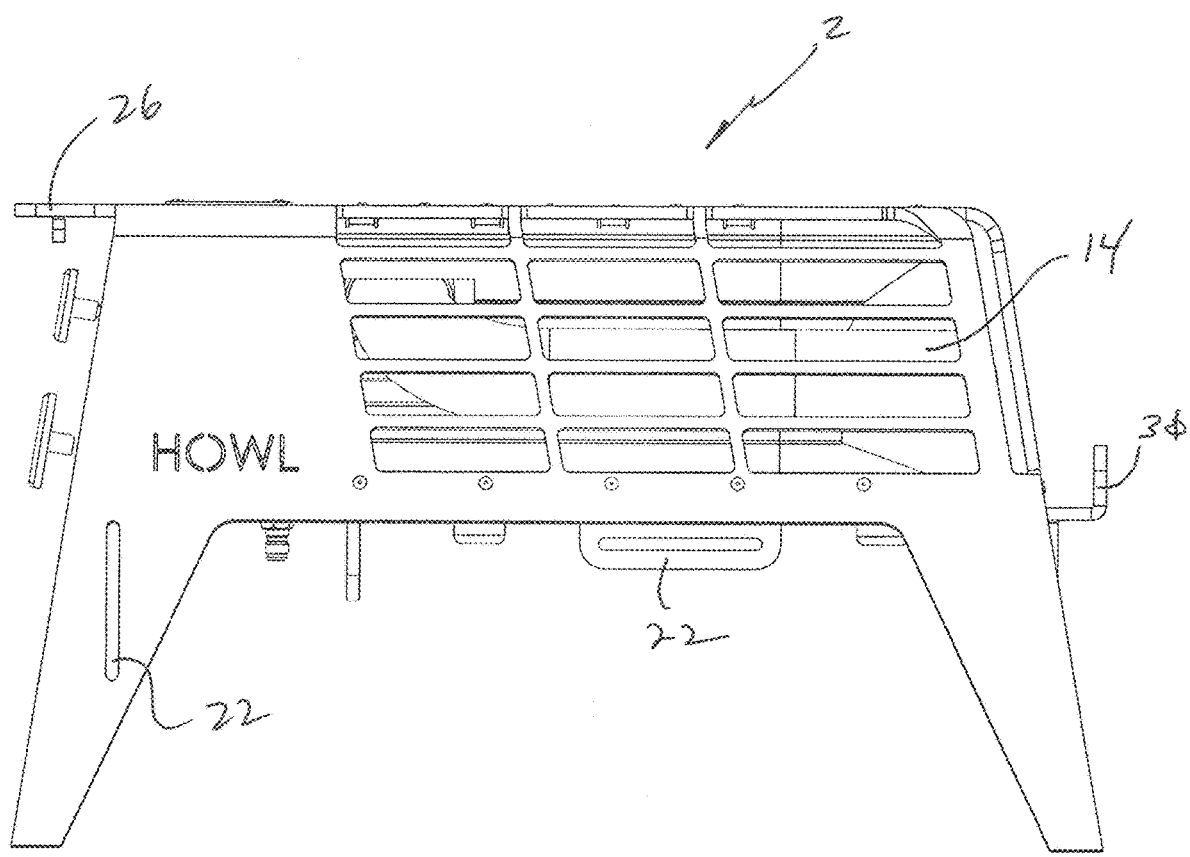
FIG. 5 is a left elevation view of the embodiment shown in FIG. 1.
Figure 6:
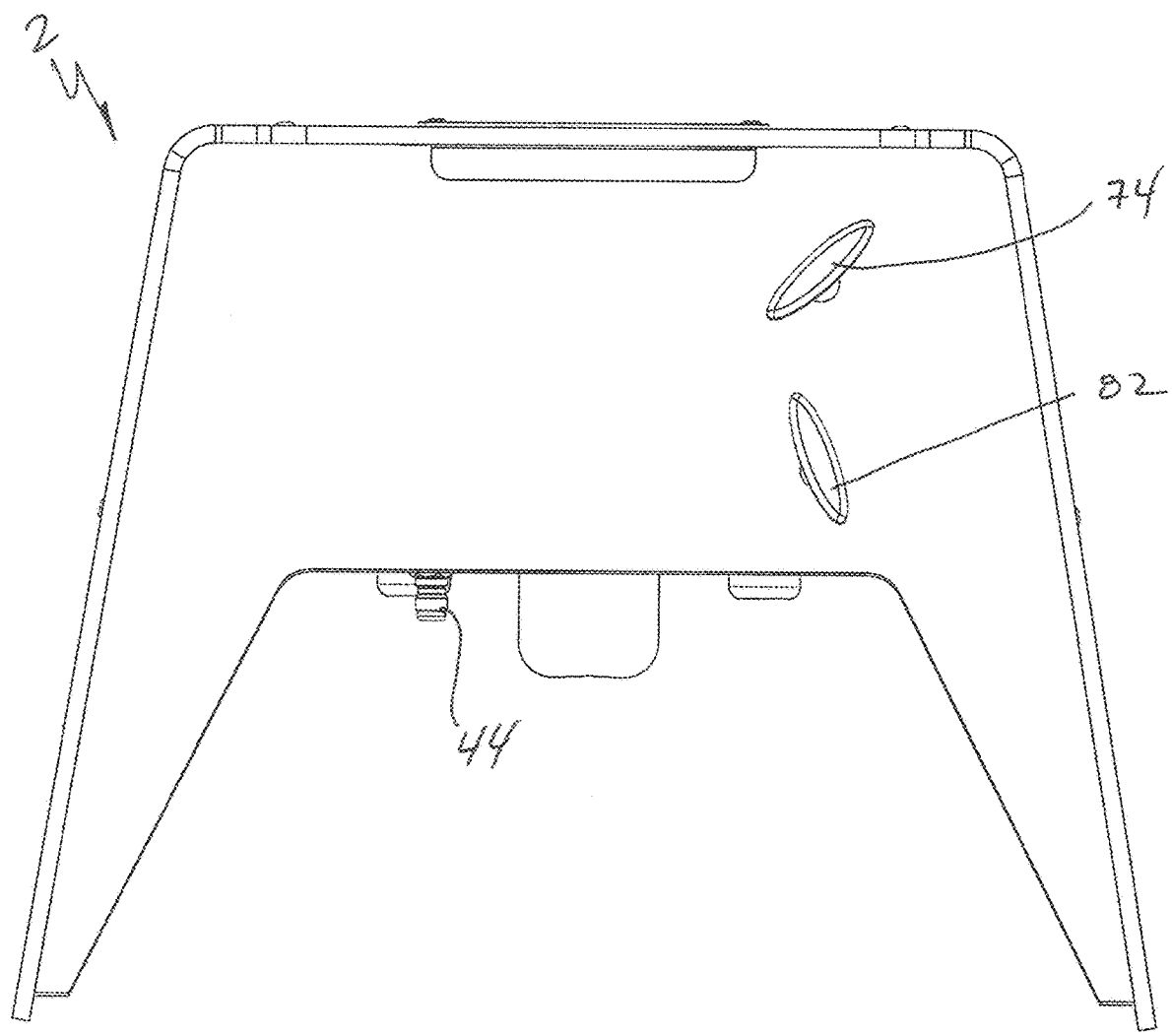
FIG. 6 is a rear elevation view of the embodiment shown in FIG. 1.

The following component list and associated numbering found in the drawings is provided to assist in the understanding of one embodiment of the present invention:

| # | Component |
|---|---|
| 2 | Portable heating device |
| 6 | Top frame |
| 10 | Bottom frame |
| 14 | Infrared heating tube |
| 18 | Opening |
| 20 | Air Intake |
| 22 | Tie down mount |
| 26 | Handle |
| 30 | Kickstand |
| 32 | Leg |
| 34 | Top surface |
| 42 | Exhaust box |
| 44 | Quick disconnect |
| 46 | Bottom surface |
| 50 | Grip |
| 58 | Burner |
| 62 | Gas jet |
| 66 | Venturi |
| 68 | Air opening |
| 70 | First valve |
| 74 | First knob |
| 78 | Second valve |
| 82 | Second knob |
| 90 | Outlet |
| 94 | Opening |
| 98 | Reflector |
| 100 | Flame burner |
| 102 | Plate |
| 106 | Gas inlet |
| 110 | Base plate |
| 114 | Top plate |
| 120 | Burner |
| 124 | Gas jet/air choke |
| 128 | Orifice |
| 132 | Tank |

-continued

| # | Component |
|---|---|
| 158 | Burner |
| 202 | Portable heating device |
| 214 | Infrared heating tube |
| 216 | Baffle |
| 220 | Air inlet |
| 222 | Tie down |
| 226 | Handle |
| 230 | Kickstand |
| 234 | Top surface |
| 244 | Quick disconnect |
| 246 | Bottom plate |
| 258 | Burner |
| 262 | Gas jet |
| 266 | Venturi |
| 274 | First knob |
| 282 | Second knob |
| 290 | Outlet |
| 298 | Reflector |
| 300 | Flame burner |
| 302 | Wind guard |
| 306 | Gas inlet |
| 310 | Base plate |
| 314 | Top plate |
| 324 | Gas/jet air choke |
| 328 | Oriface |
| 350 | Ridges |
| 354 | Valley |
| 360 | Gutter |
| 400 | Gas jet |
| 420 | Air intake |
| 424 | Fuel intake |
| 428 | Combustion chamber |
| 432 | Longitudinal axis |
| 436 | Fuel/air mixing zone |
| 444 | Port |
| 448 | Outlet |
| 452 | Intake baffle |
| 456 | Outlet baffle |
| 458 | Burner |
| 460 | Vane |
| 464 | Opening |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-8 show a portable heating device 2 of one embodiment of the present invention generally comprising a top frame 6 and the bottom frame 10 that house at least one infrared heating tube 14. Embodiments of the present invention described and shown herein can employ a single or multiple heating tubes without departing from the scope of the invention. In one embodiment, the top frame 6 is a single sheet of aluminum cut and bent to form the outer structure of the portable heating device 2. Likewise, the bottom frame 10 may consist of a single sheet of aluminum cut and bent to form a unitary structure interconnected to the top frame 6. In other embodiments, the top frame 6 and/or bottom frame 10 consist of separate metallic or heat-resistant sheets that are interconnected. In the embodiment shown, the top frame 10 includes a plurality of openings 18 that allow radiant heat generated by the infrared heating tube to escape the portable heating device and, thus, warm the surrounding area. The top frame 6 and/or bottom frame 10 may include a plurality of strap tiedown mounts 22, a handle 26, and the kickstand 30, which will be described in further detail below. The outer structure may include or selectively receive radiator wings that redirect heat toward the portable heating device. Further, legs 32 associated with the top frame 6 may be removable.

Figure 7:
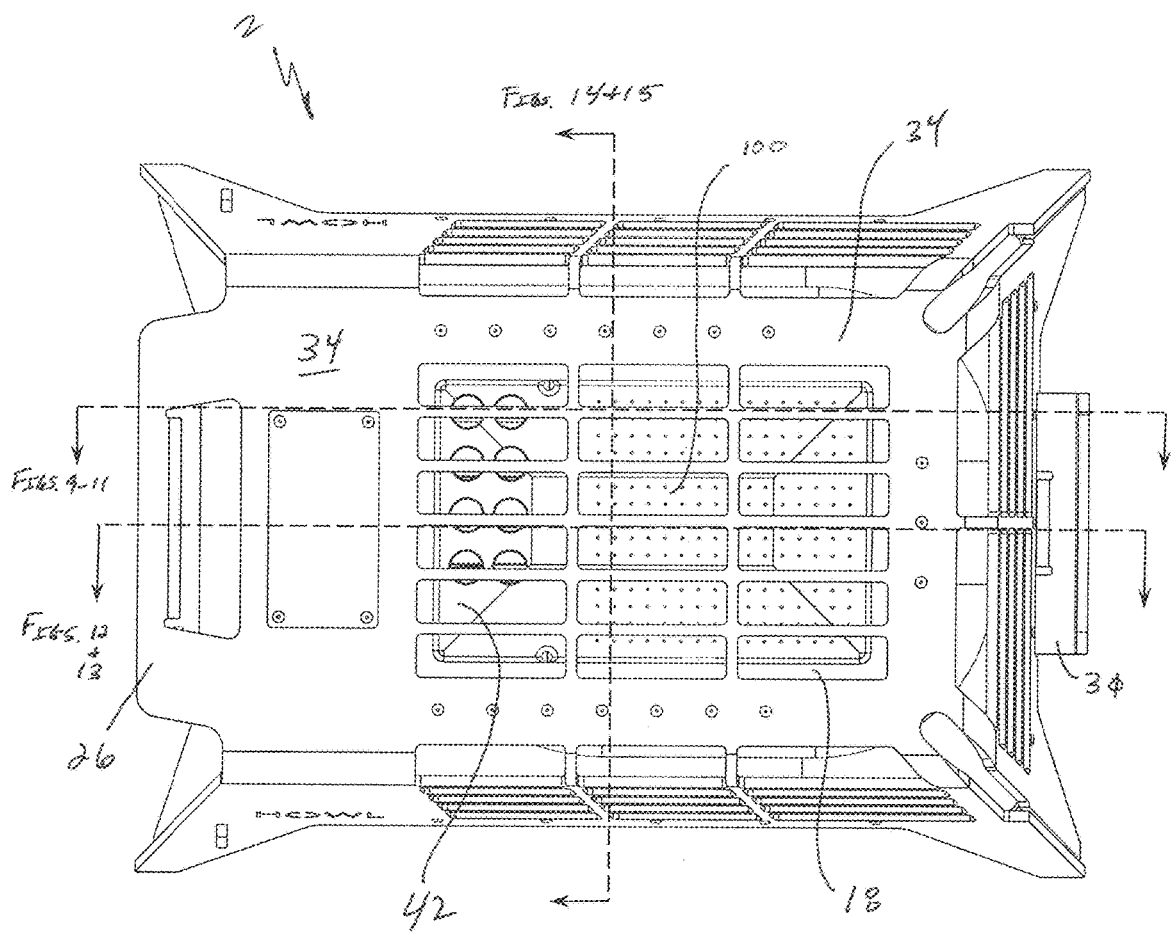
FIG. 7 is a top plan view of the embodiment shown in FIG. 1.

FIG. 7 is a top plan view of the portable heating device 2 showing a plurality of openings 18 provided in a top surface 34 thereof. The top surface 34 may be configured to be a cooking surface, wherein heat emanating from a flame burner 100 rises through the plurality of openings 18. This figure also shows the infrared heating tube's exhaust box 42 that expels additional convective heat through at least a portion of the openings.

Figure 8:
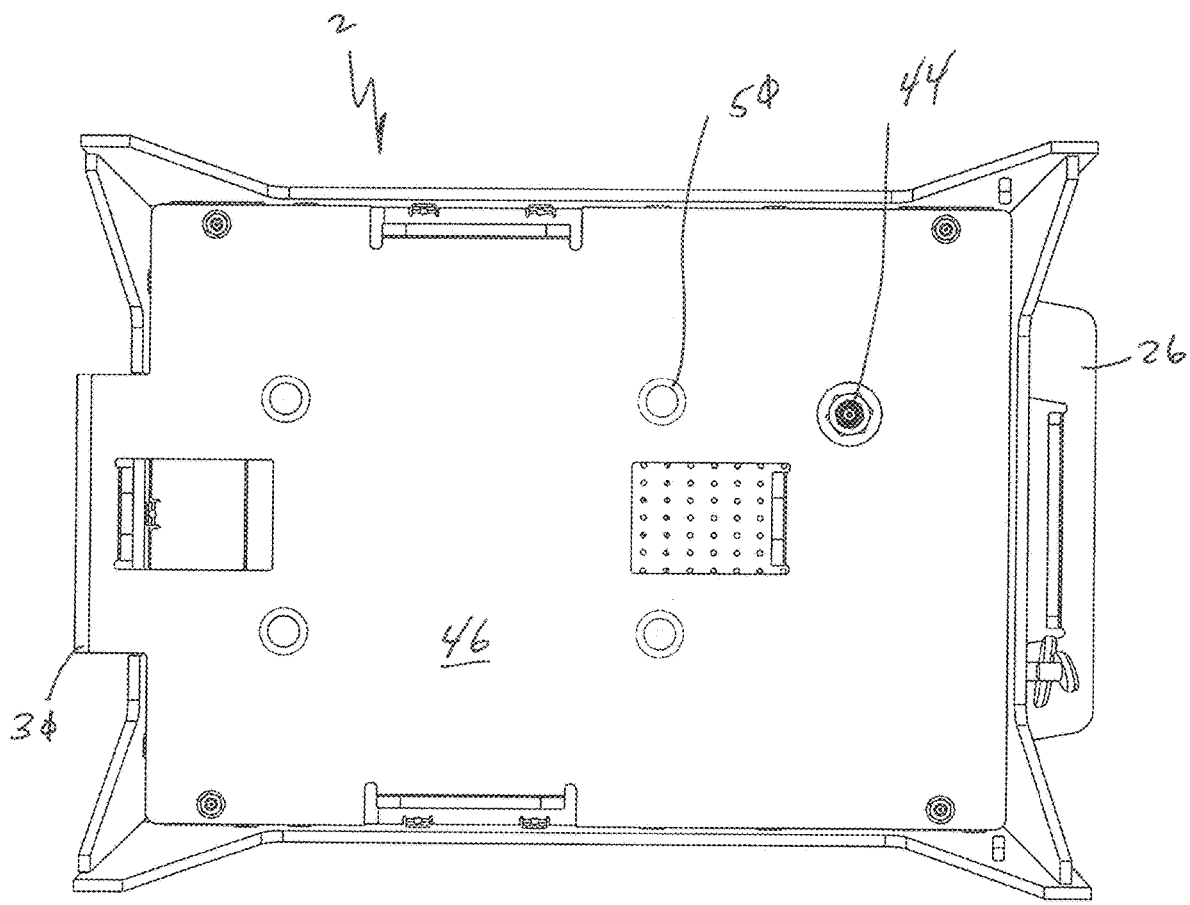
FIG. 8 is a bottom plan view of the embodiment shown in FIG. 1.

FIG. 8 is a bottom plan view of the portable heating device 2 that accommodates a quick disconnect connector 44 adapted to receive a hose that is also interconnected to a source of gas, e.g., a propane tank. The bottom surface 46 of the bottom frame 10 also may include a plurality of grips 50 configured to engage with a propane tank, which will be described below.

FIGS. 9-13 are cross-sections of the portable heating device 2 showing the internal components employed by some embodiments of the present invention. An infrared tube heater generally comprises the heating tube 14 with a wire mesh burner 58 at one end. A piezoelectric igniter (not shown), which may be located at or adjacent to the end of the tube 14, is used to initiate combustion, thereby creating a flame. The flame then extends up the tube 14 until it reaches the metal mesh burner 58. The other end of the heating tube 14 is associated with the exhaust box.

In operation, gas exiting the gas jet 62 is accelerated by the venturi 66 and ignited by the wire mesh burner 58. In one embodiment, a high-pressure gas regulator directs propane through the gas jet 62 into the venturi 66. The gas jet 62 directs gas at high-pressure into the venturi 66 and pulls air only from openings 68, e.g., slots, located behind the gas jet 62. In other embodiments, the gas jet includes openings 68 behind the gas jet and a plurality of air intake 20 openings positioned around the gas jet. Thus, the contemplated burner system uses 100% primary air. Using high-pressure gas to draw needed air for combustion allows the portable heating device to function without performance loss at high and low elevations. More specifically, the pressure gradient associated with the moving high-pressure gas is sufficient to move the same number (with respect to mass) of high-altitude, lower-density air molecules as low-altitude, higher-density air molecules. Accordingly, regardless of altitude, the 100% primary air system achieves stoichiometric combustion in the heating tube that raises the burn temperature to about 1000 degrees F., giving the tube an orange glow that creates infrared heat and light.

Hot gases are directed along the length of the heating tube 14 to produce radiant heat. Heated gases exiting the exhaust box will also produce a visible flame and convective heat through openings in the top frame. The tube 14 will emit visible and infrared light that warms nearby users. Some embodiments include twisted tape turbulators generally matching the inside radius of the heat tubes that push hot combustion gases and flames against tube sides, causing more heat transfer into the tubes, which increases heat output efficiency and stabilizes the gas pressure in the tubes for consistent operation.

In one embodiment, the burner receives fuel (e.g., propane) expelled through a gas jet 62 via a venturi 66 that is designed to accelerate the fuel and to draw in ambient air for combustion. The gas jet 62 may include a precise pinhole orifice that emits a jet of pressurized (e.g., 5 psi), high-speed propane gas that is aimed through the center of the venturi. The gas jet also includes at least one air inlet 20 about its perimeter that allows atmospheric air to be drawn into the venturi by the momentum of the fuel jet. The venturi speeds an air/fuel mixture toward the metal mesh burner that may comprise six layers; each layer rotated 15° from its neighboring mesh layer. The layers of metal mesh thoroughly mix air and fuel for more efficient combustion.

The jet assembly of this embodiment entrains all the atmospheric air needed for combustion from a protected compartment defined by a cavity within the device. Thus, the system is not affected by wind, and even strong winds (e.g., 120 mph winds) do not alter the functionality or heat output of the burner assembly. Further, because of the principles of momentum, mass, and density, the burner assembly works at nearly all densities of the earth's atmosphere, meaning it operates normally at every altitude from sea level to the highest peaks in the continental U.S.

Figure 9:
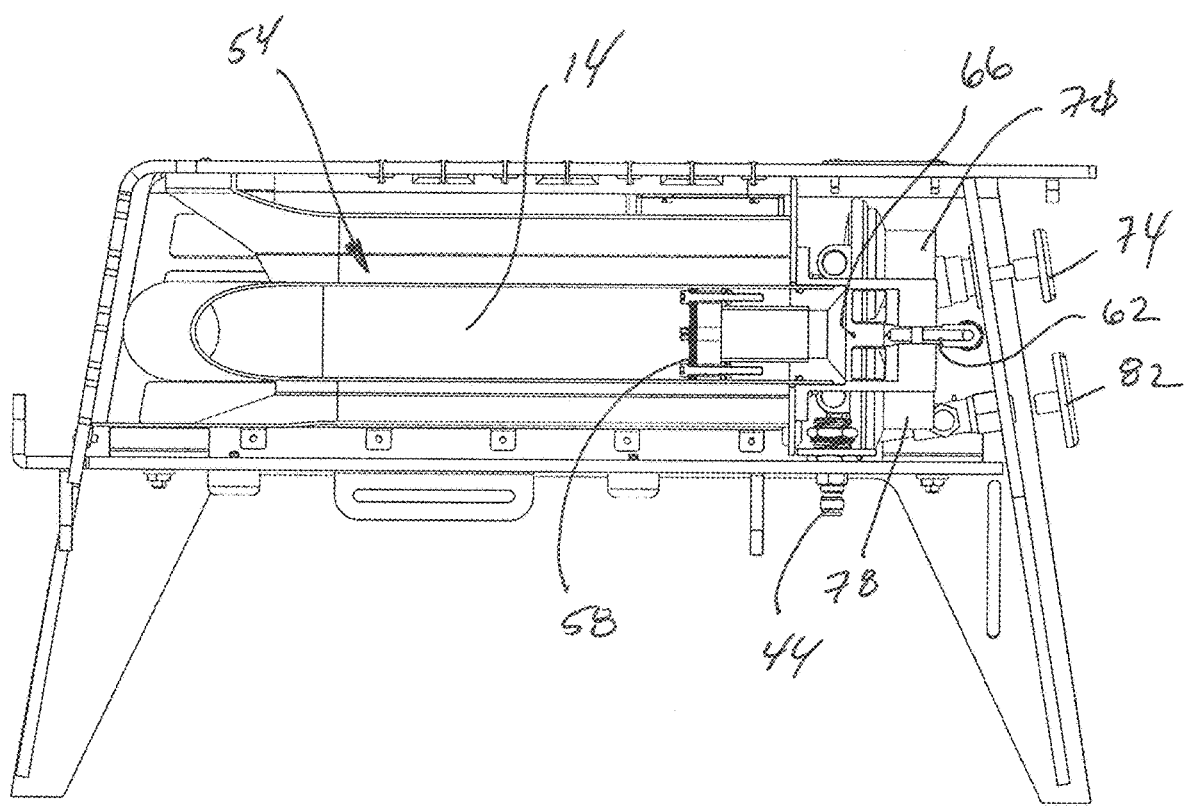
FIG. 9 is a cross-sectional view of FIG. 7.
Figure 10:
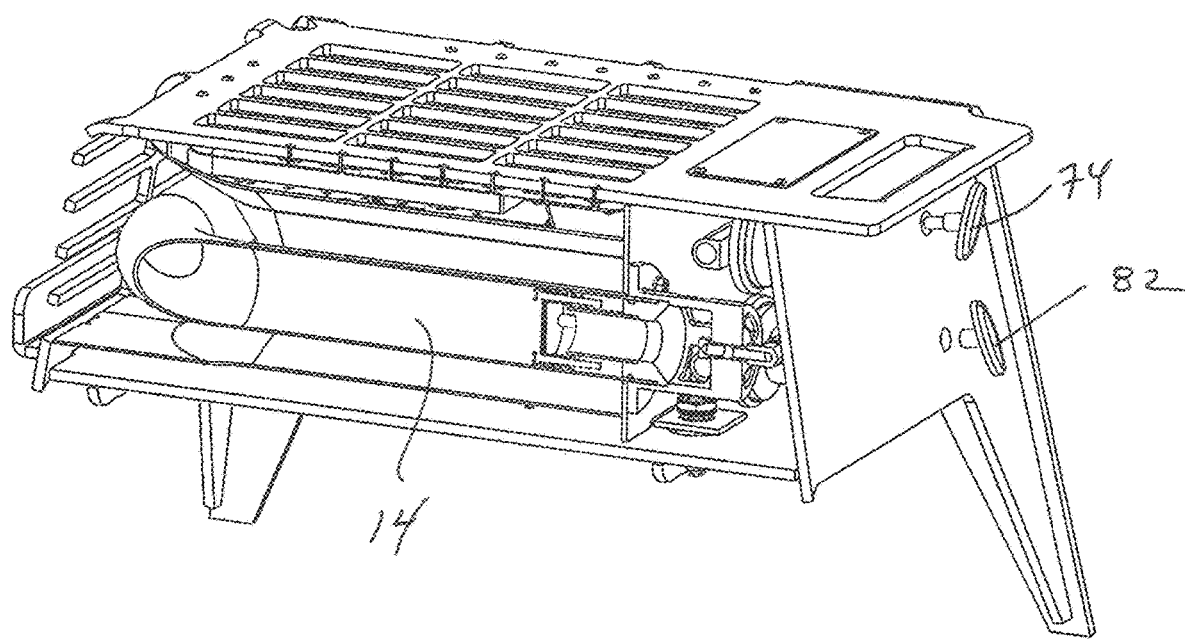
FIG. 10 is a cross-sectional view of FIG. 7.
Figure 11:
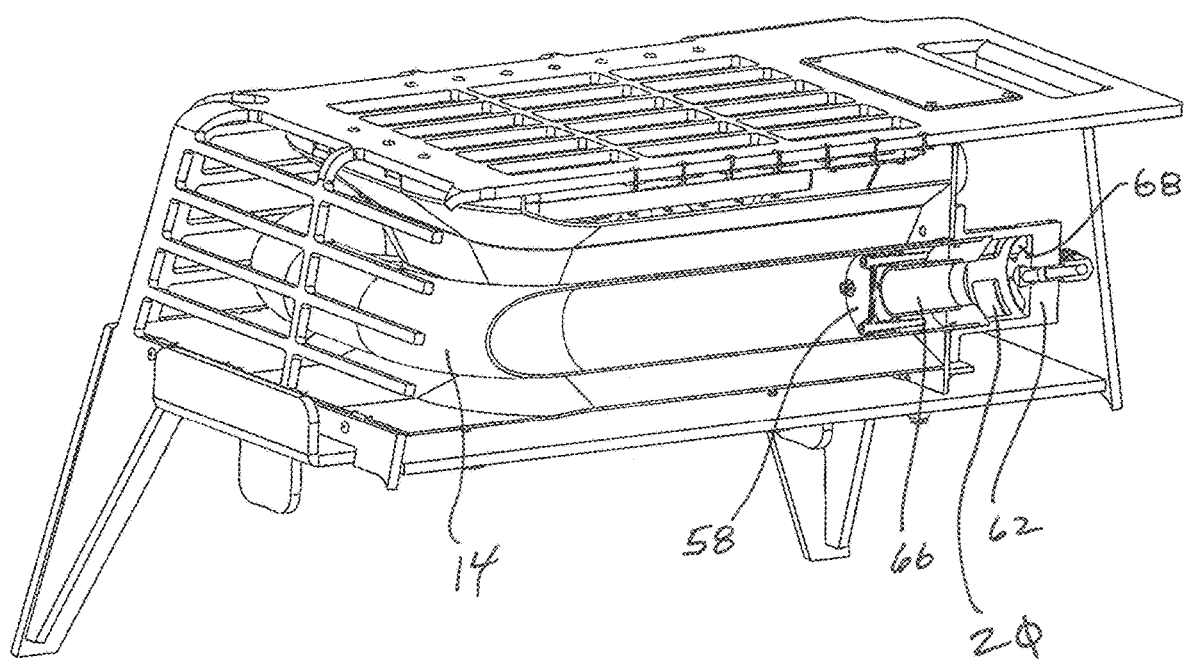
FIG. 11 is a cross-sectional view of FIG. 7.
Figure 12:
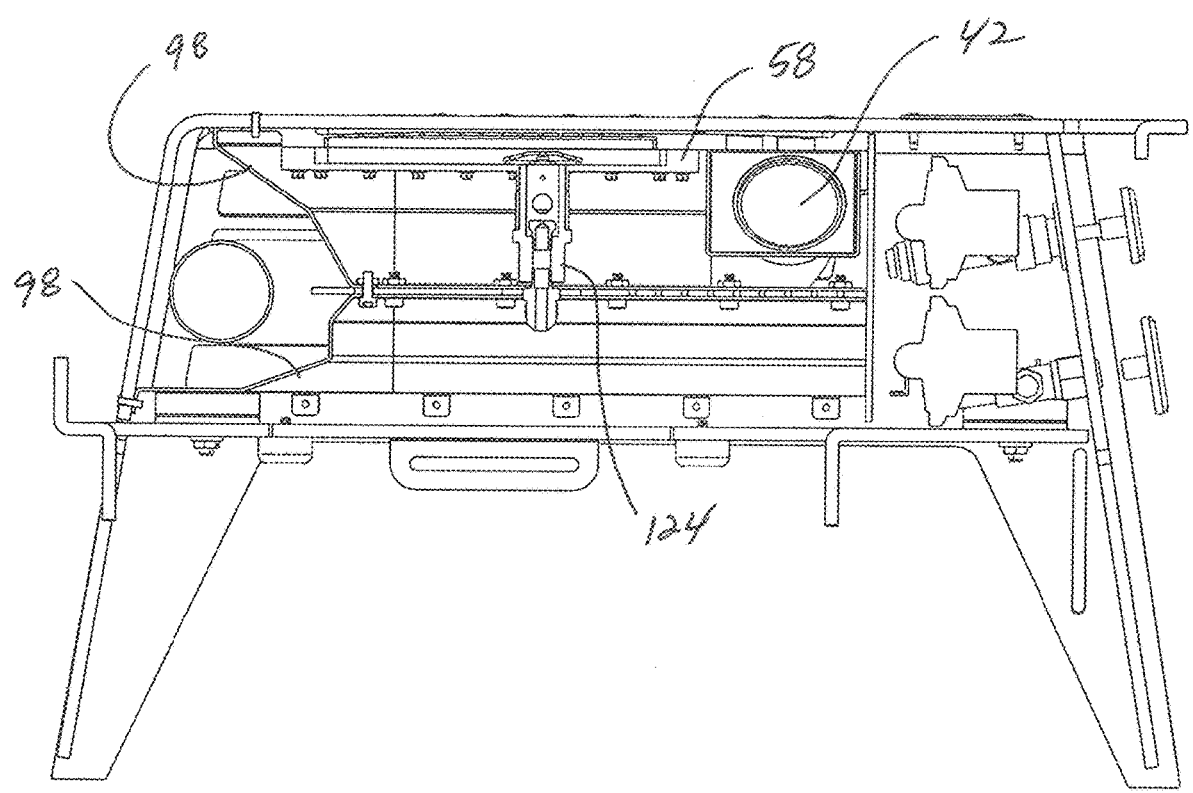
FIG. 12 is a cross-sectional view of FIG. 7.
Figure 13:
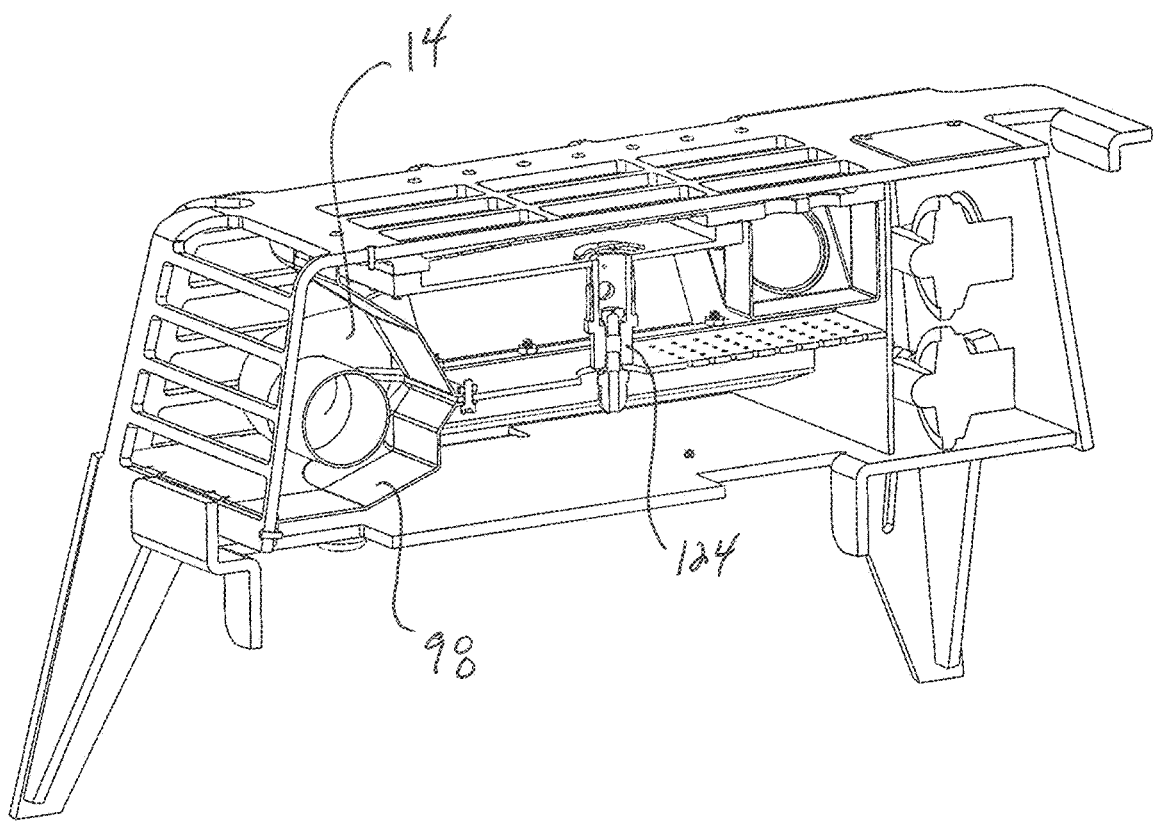
FIG. 13 is a cross-sectional view of FIG. 7.

FIG. 9 shows a first valve that initiates and ceases fuel flow (and, thus, feed air) associated with heating tube operation. The first valve is selectively operated by a first knob 74. A second valve 78 initiates and ceases fuel flow to the flame burner (i.e., a cooking portion of the portable heating device). The second valve 78 is selectively controlled by a second knob 82.

Figure 14:
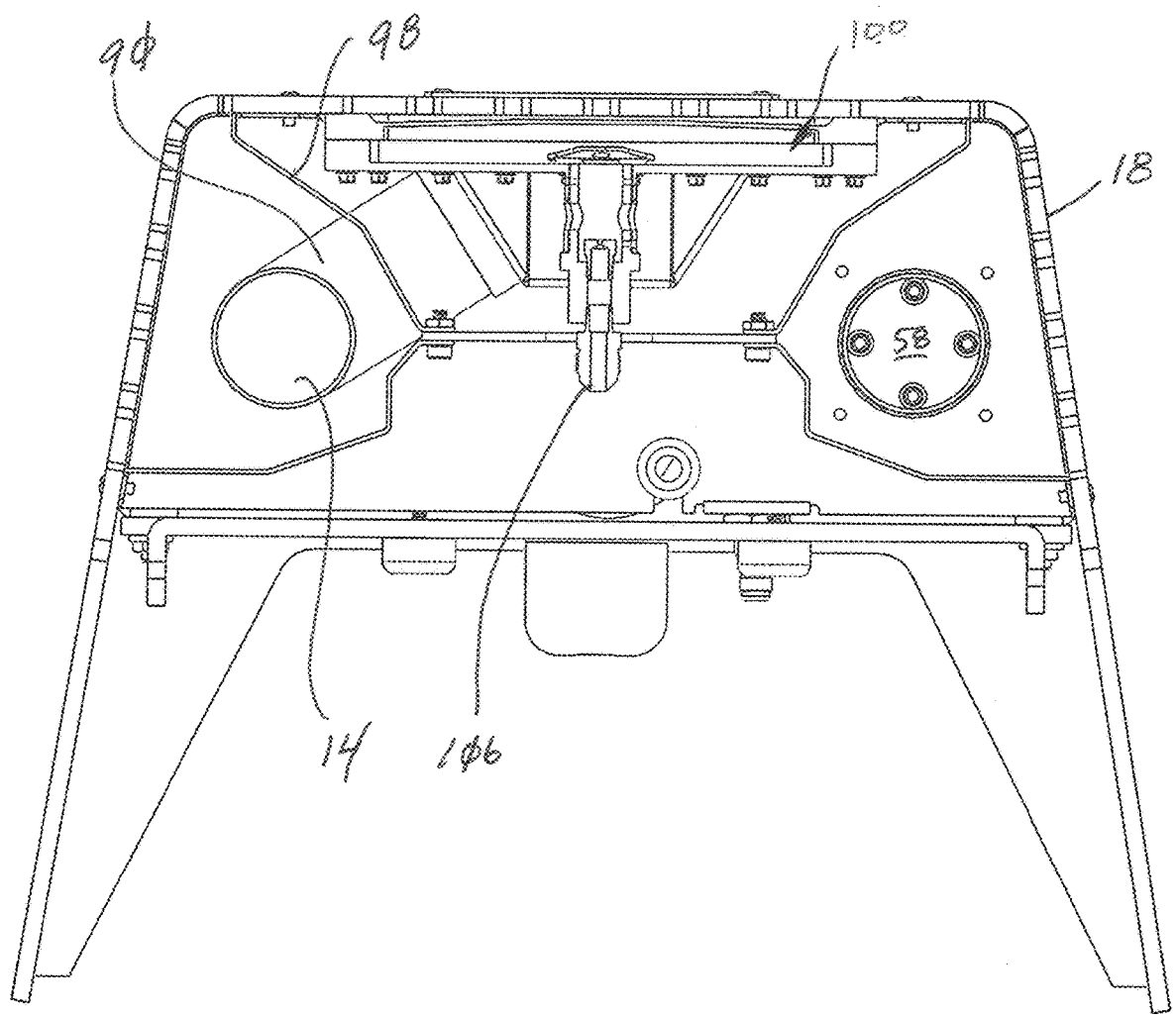
FIG. 14 is a cross-sectional view of FIG. 7.
Figure 15:
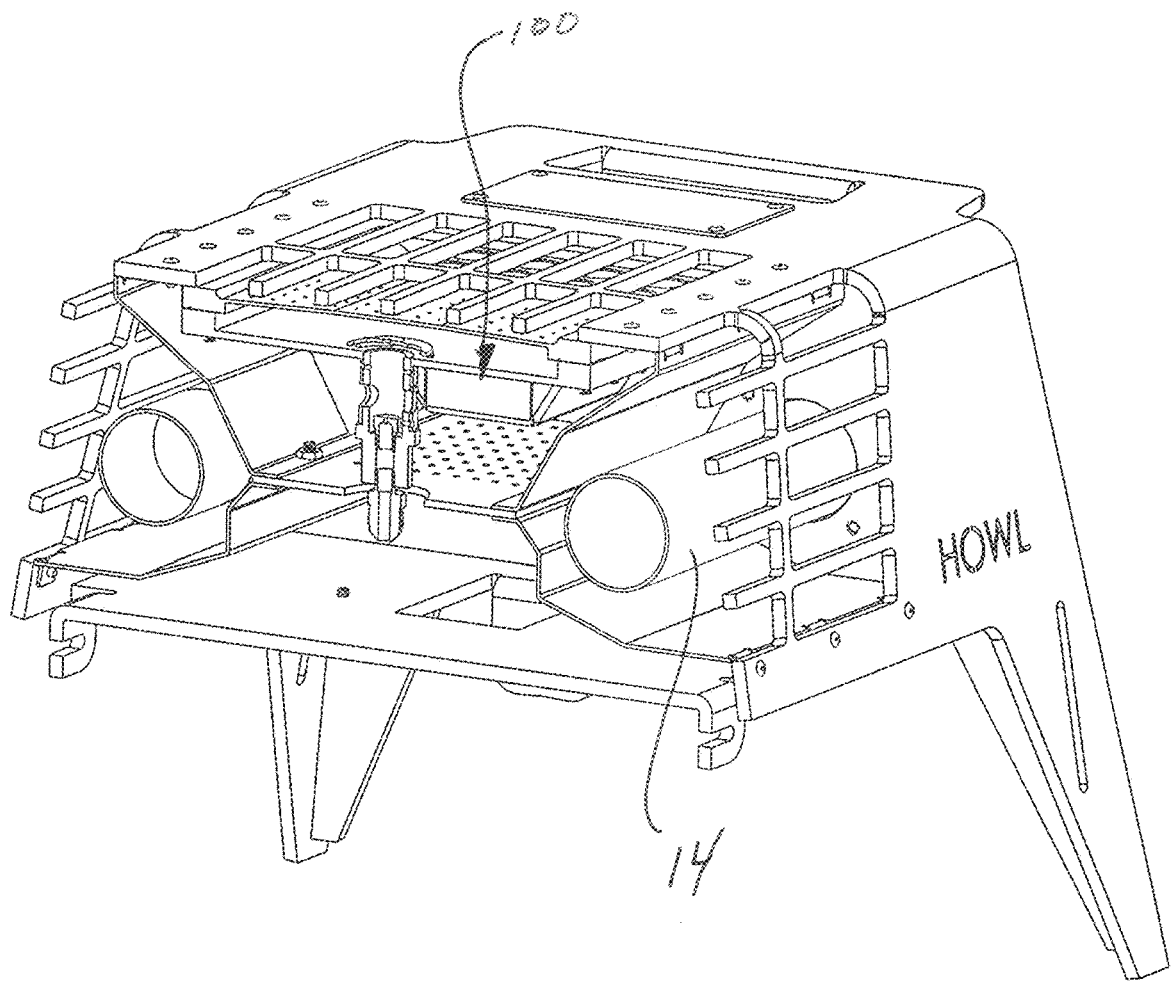
FIG. 15 is a cross-sectional view of FIG. 7.
Figure 18:
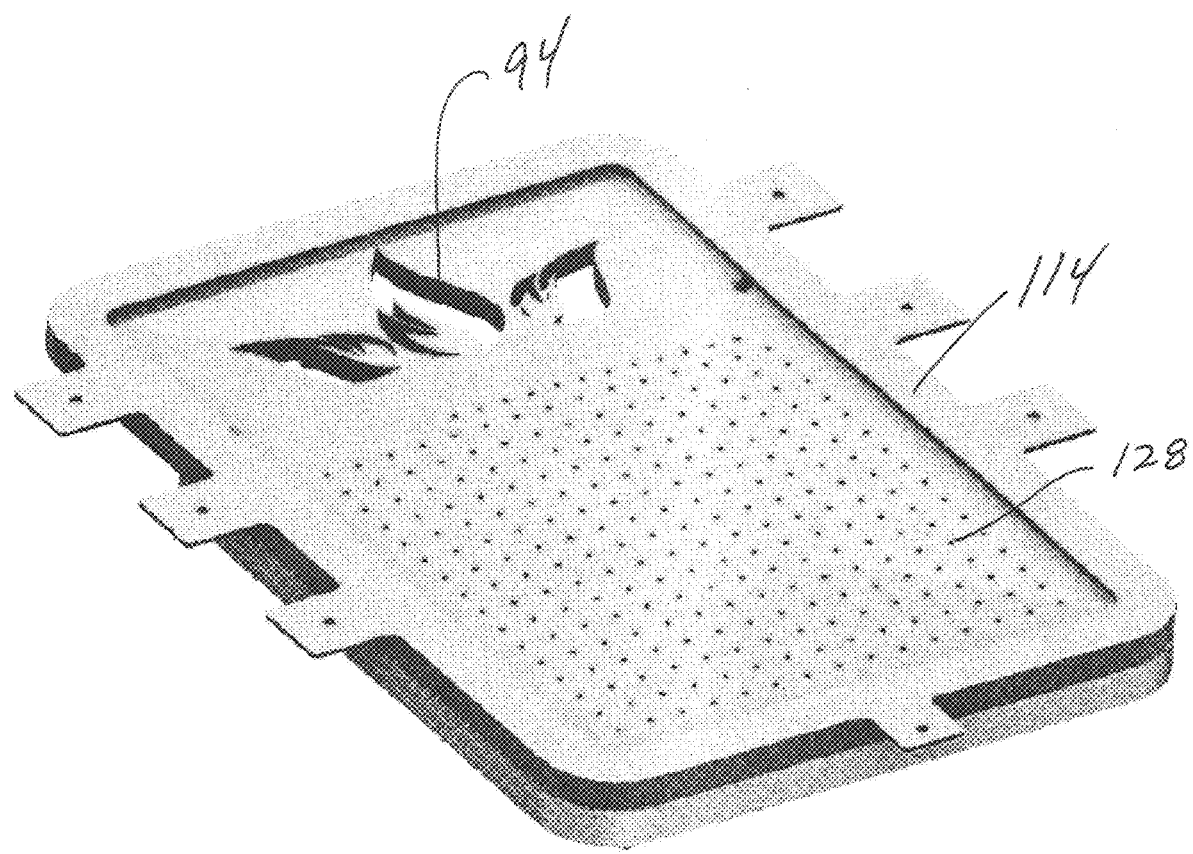
FIG. 18 is a perspective view of a top plate of the flame burner shown in FIG. 16.

FIGS. 14 and 15 show how the outlet 90 of the heating tube 14 of one embodiment is angled upwardly to meet the flame burner 100, which allows hot exhaust gases and an open flame to exit an opening 94 (see FIG. 18). Some embodiments, however, provide a separate propane source that feeds the flame burner. These figures also show a reflector 98 positioned within the curled heating tube 14. The reflector 98 facilitates the direction of heat out of openings 18 provided in the sides of the portable heating device. The reflectors 98 also accommodate a plate 102 that supports a gas inlet 106 associated with the second valve described above. The reflector 98, which may comprise electropolished aluminum, acts like a mirror to reflect IR light emitted by the heat tubes toward the user's shins, knees, and thoracic region.

Figure 16:
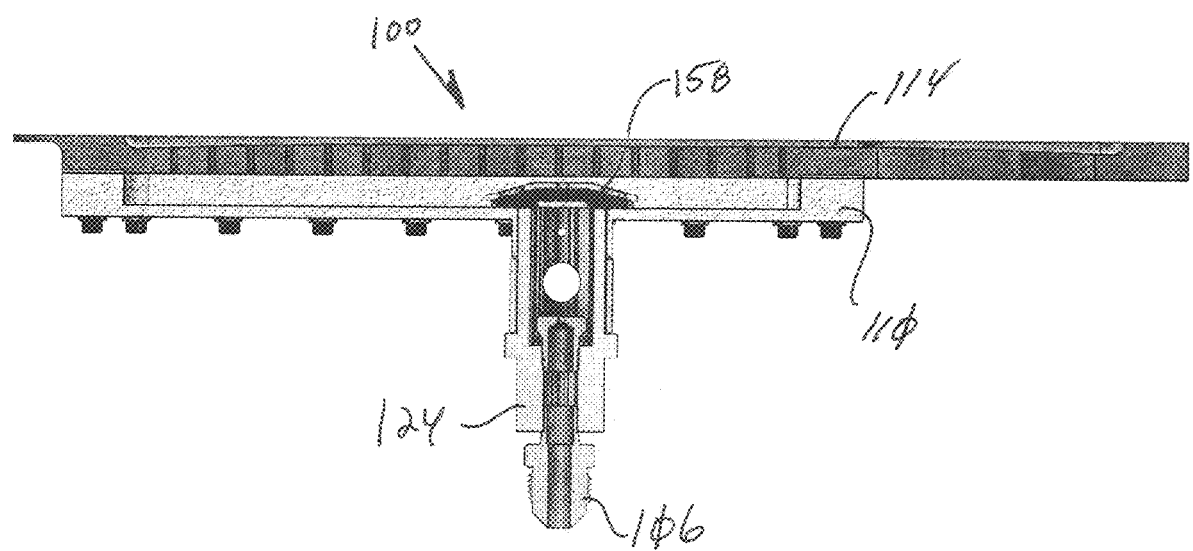
FIG. 16 is a cross-sectional view of a flame burner of one embodiment of the present invention.
Figure 17:
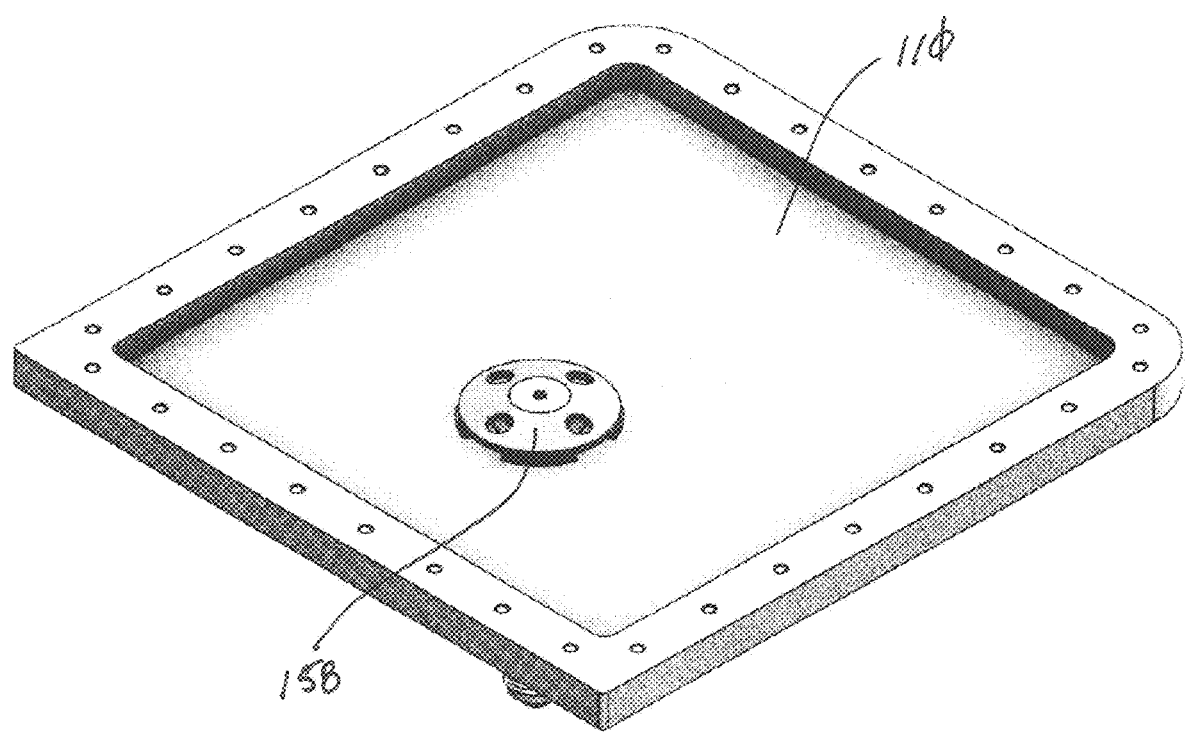
FIG. 17 is a perspective view of the base plate of the flame burner shown in FIG. 16.

FIGS. 16-18 show the flame burner 100 of one embodiment of the present invention, generally comprised of a base plate 110 interconnected to a top plate 114 with a gasket therebetween. The gasket may be a two-piece, dovetailed, high temperature carbon gasket designed to prevent fuel leakage. The top plate 114 of one embodiment possesses a plurality of small, closely spaced orifices 128 that emit propane. This design builds a larger, brighter flame than designs with fewer, larger emitters. This top plate design also allows the flame to grow quite large without combusting excess fuel, unlike traditional burners that use large quantities of fuel to create large flames. The bottom plate accommodates a burner 158 that creates a flame that is exhausted through the plurality of orifices 128.

The base plate 110 accommodates a burner 120 associated with a gas jet with an air choke 124 that receives fuel from the fuel inlet 106. This burner 120 supplies heat to the top plate 114 through a plurality of orifices 128. The top plate 114 also includes the opening 94 mentioned above. The base plate 110 may have a dish-shaped profile that, when two top plate 114s are interconnected, creates a chamber that holds propane admitted through the plurality of orifices in the top plate.

Figure 19:
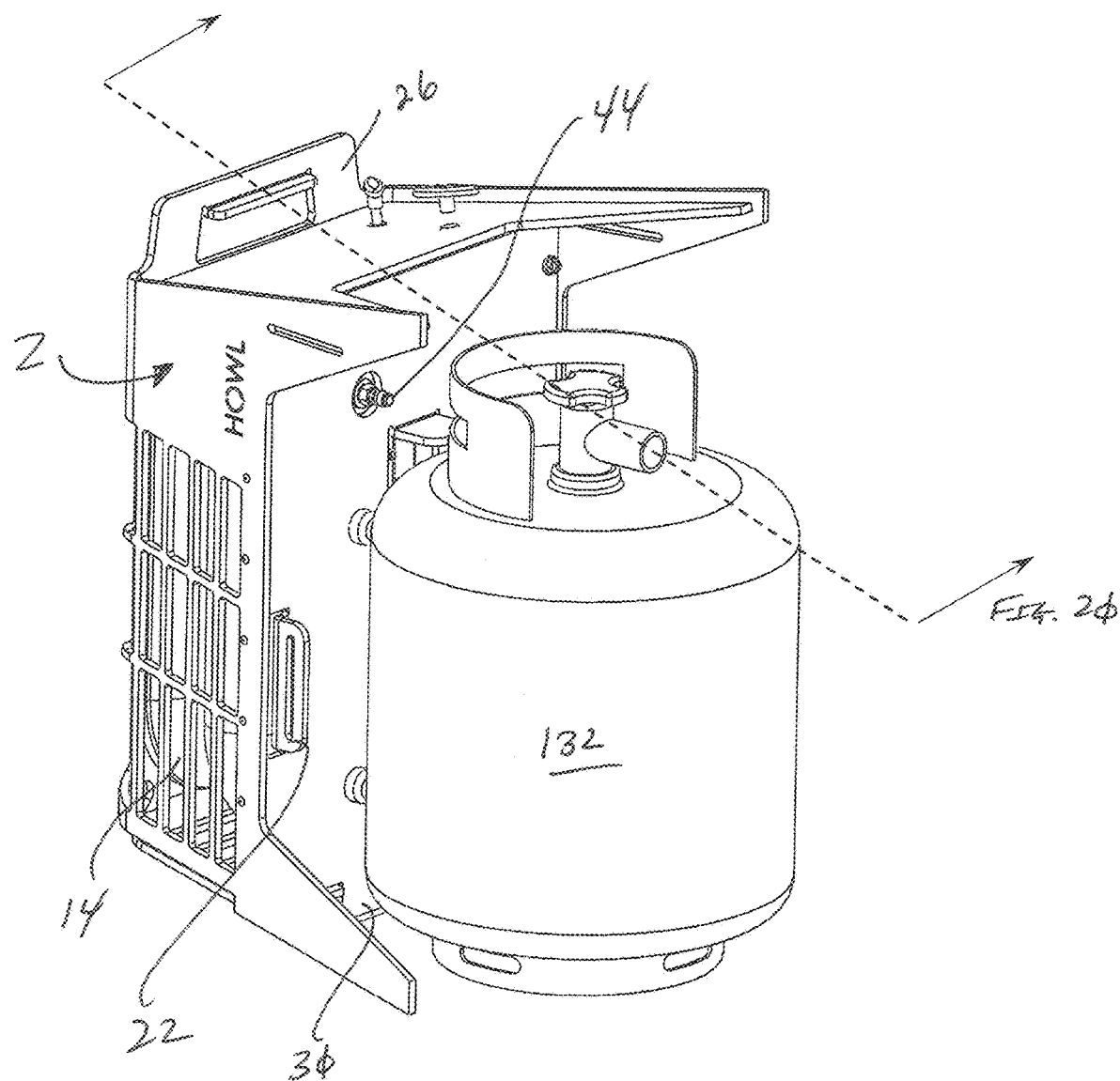
FIG. 19 shows the portable heating device in the second position of use and configured to receive a propane tank.
Figure 20:
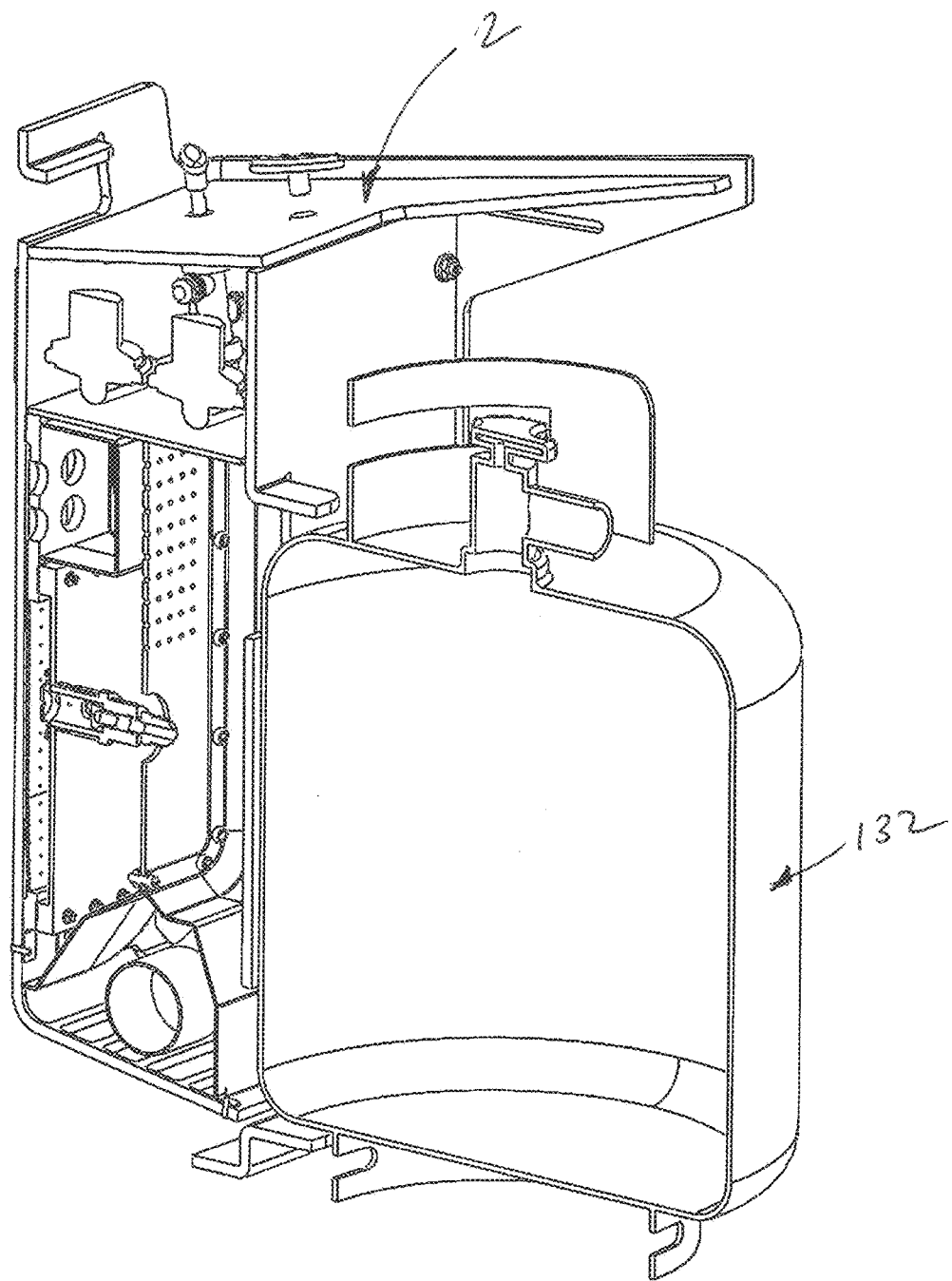
FIG. 20 is a cross-sectional view of FIG. 19.

FIGS. 19 and 20 show a propane tank 132 interconnected to the portable heating device of one embodiment of the present invention for transport. More specifically, embodiments of the present invention are designed to receive gas from a propane or a liquid natural gas tank located some distance from the portable heating device, which ensures safe operation. However, to facilitate transport, the portable heating device 2 may rest on the kickstand 30, making the handle 26 easily accessible. In this configuration, the propane tank 132 is engaged against at least one grip 50, and straps (not shown) interconnected to the tiedown mounts 22 are used to secure the propane tank to the portable heating device. The handle and/or tiedowns may be used to attach the combined portable heating device and propane tank to a vehicle, directly or by way of a custom mount. Further, the gas quick disconnect 44 is blocked by the tank 132 in this configuration, thereby preventing the tank from being interconnected to the portable heating device with a hose.

FIG. 21-24 show the device 202 of another embodiment of the present invention that includes a frame comprised of the top surface 234 having a plurality of legs that support a bottom plate 246 above the ground. The frame also includes a plurality of tiedown mounts 222, a handle 226, and the kickstand 230. Like the embodiment described above, the frame accommodates a curled infrared heating tube 214 that is at least partially surrounded by reflector 298. Finally, the frame supports a flame burner 300 and the control panel, which accommodates gas jets 262 that control the gas that feeds the tube heater 214 and the flame burner 300. In some embodiments, a wind guard 302 is provided. The wind guard 302 includes 12 large circular holes through which flames extend. In operation, open flames are protected and do not extinguish during strong wind gusts, and they return to their normal height after the wind passes.

Figure 21:
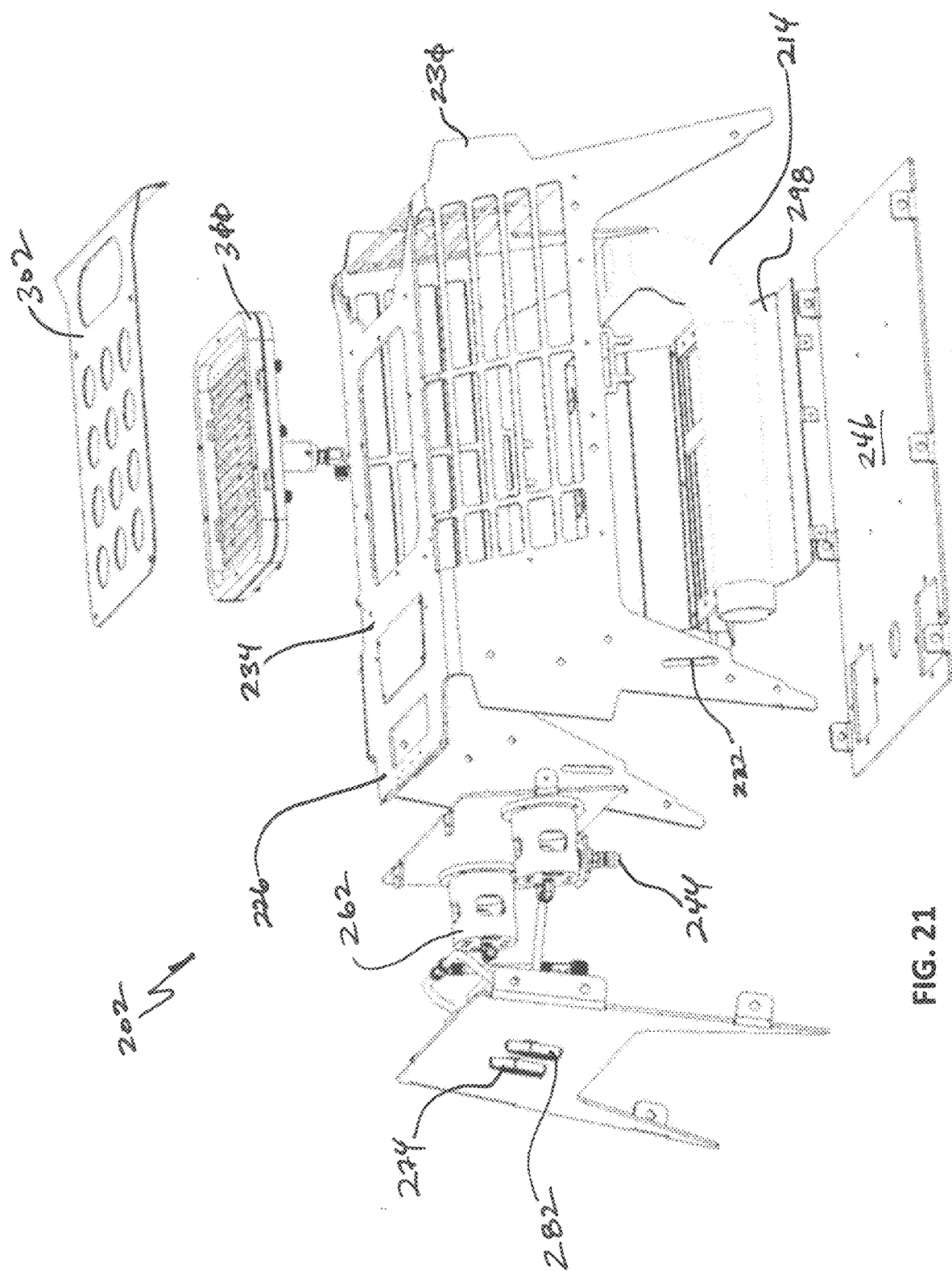
FIG. 21 is an exploded perspective view of another embodiment of the present invention.
Figure 22:
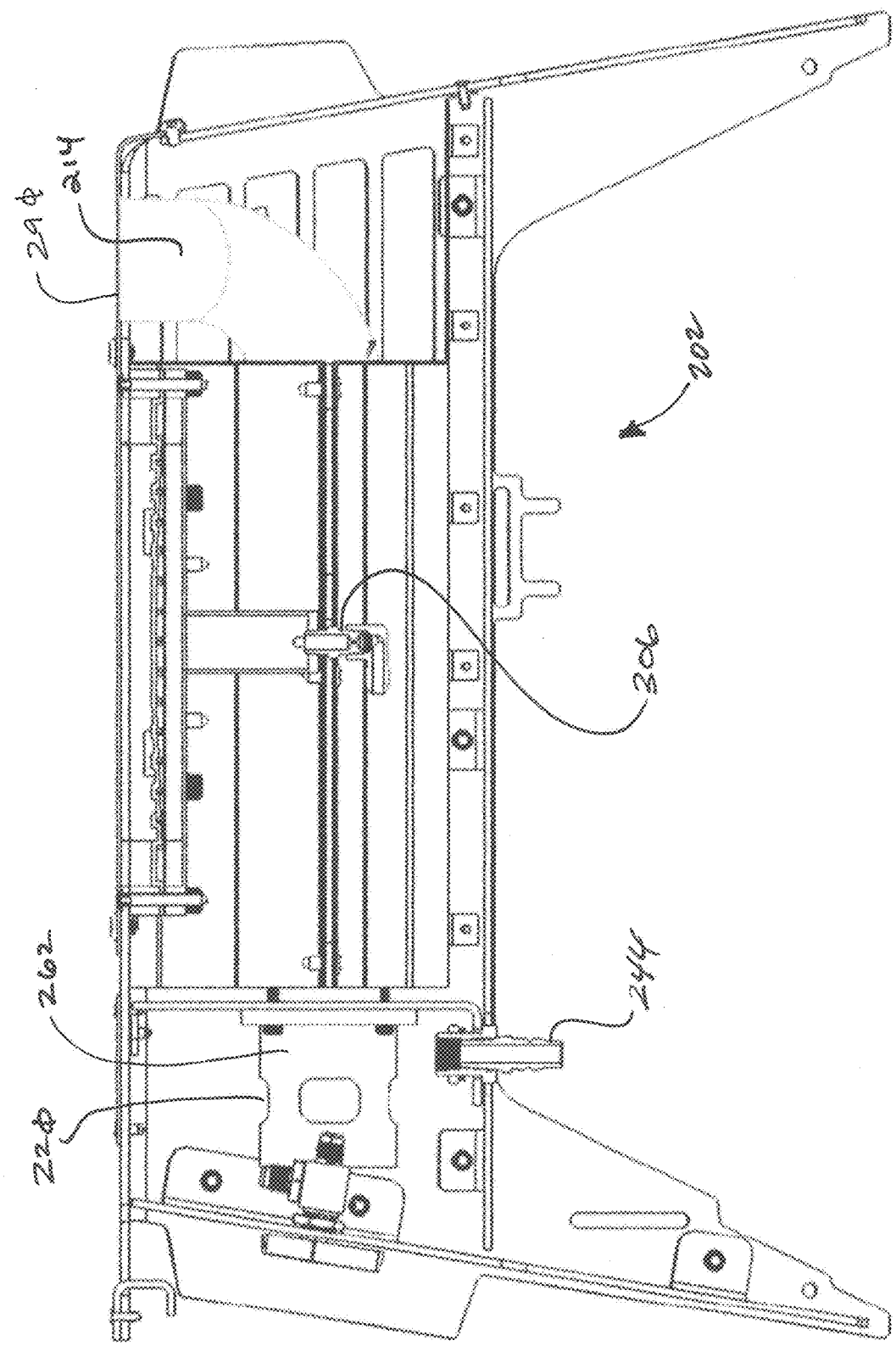
FIG. 22 is a cross-sectional view of the embodiment shown in FIG. 21.
Figure 23:
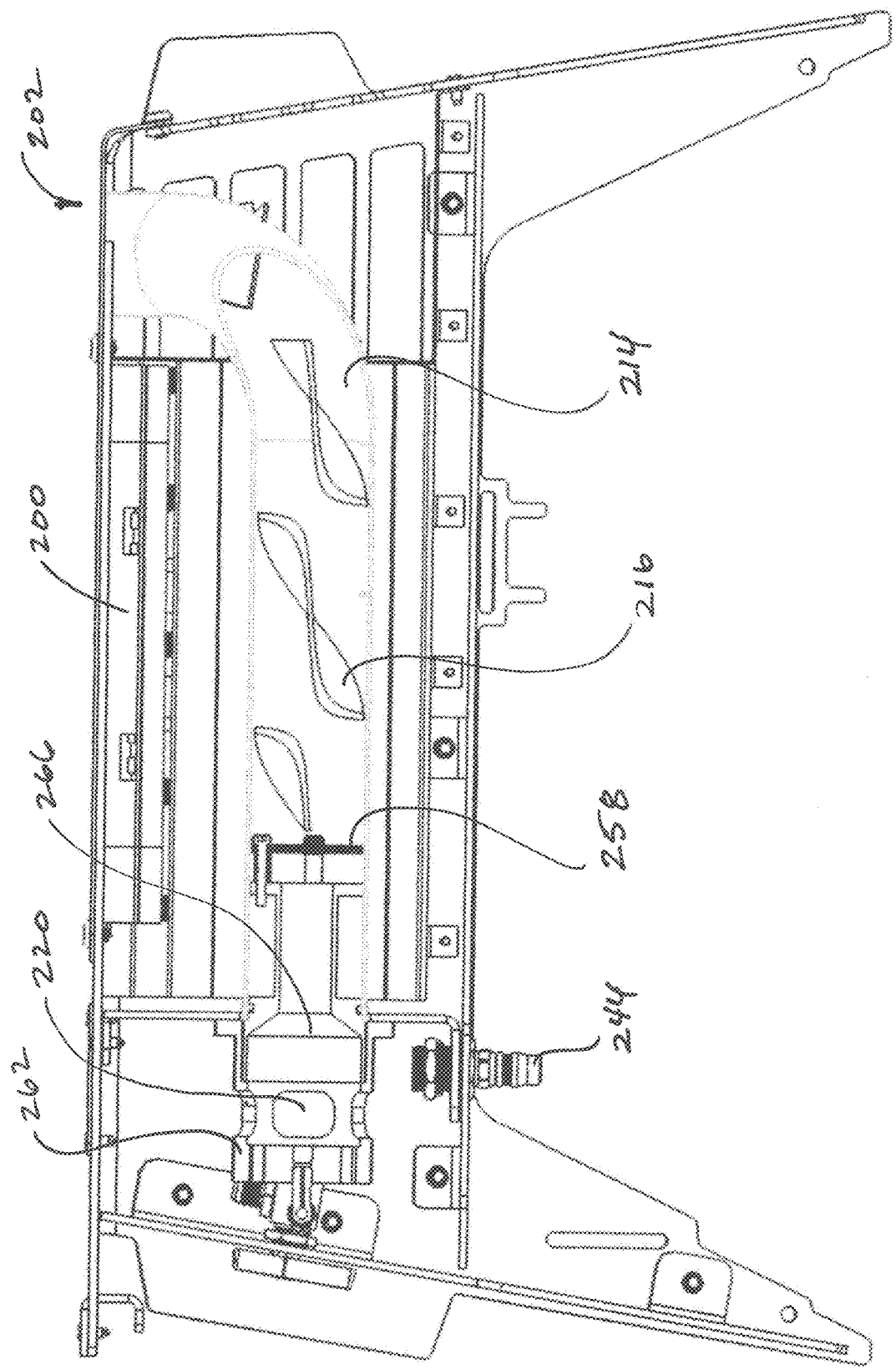
FIG. 23 is another cross-sectional view of the embodiment of FIG. 21.
Figure 24:
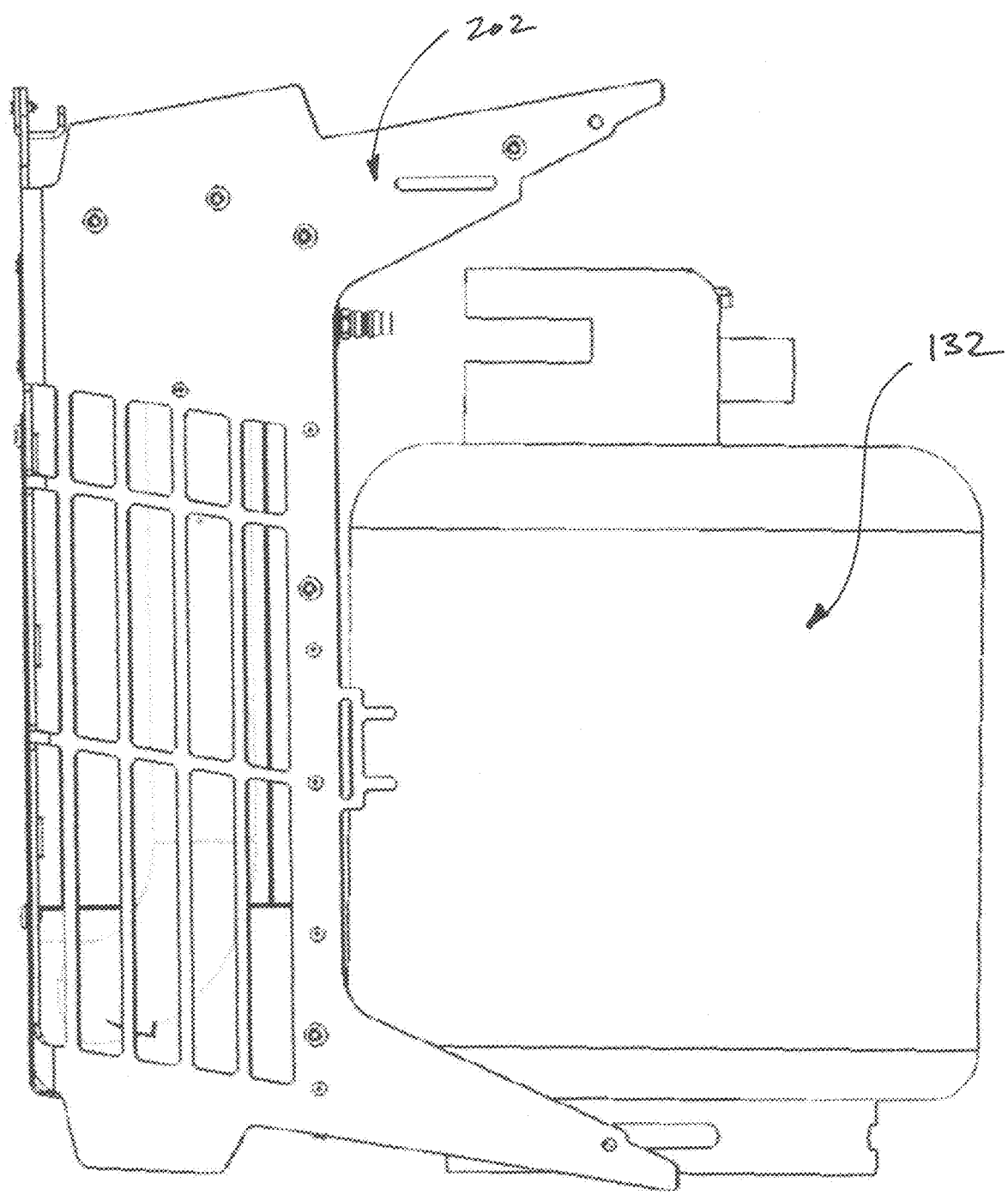
FIG. 24 shows the portable heating device of FIG. 21 in the second position of use and configured to receive a propane tank.

FIGS. 22 and 23 are cross-sectional views of the embodiment shown in FIG. 21. Here, it can be observed that the gas jet 262 includes a plurality of air intakes 220 that feed air into a Venturi 266 when pressurized gas is directed into the gas jet. As described above, the air-gas mixture is ignited by a burner 258 and a flame with associated hot gases is directed along the length of the heating tube 214. Some embodiments include twisted tape baffles (e.g., turbulators) 216 provided within the heating tube 214 two reduce laminar flow, thereby maintaining hot gases within the tube for extended periods of time.

Figure 25:
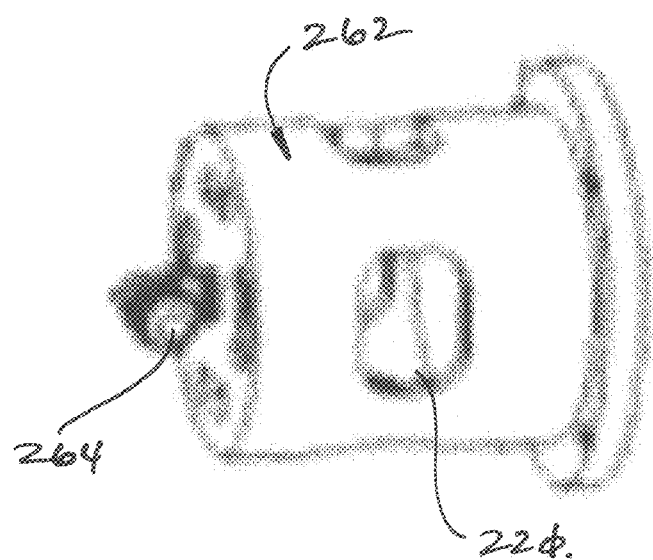
FIG. 25 is a gas jet of one embodiment of the present invention.

FIG. 25 is a perspective view of the gas jet 262 of one embodiment of the present invention that includes a gas inlet 264 interconnected to a housing that also possesses a plurality of air inlets 220.

Figure 26:
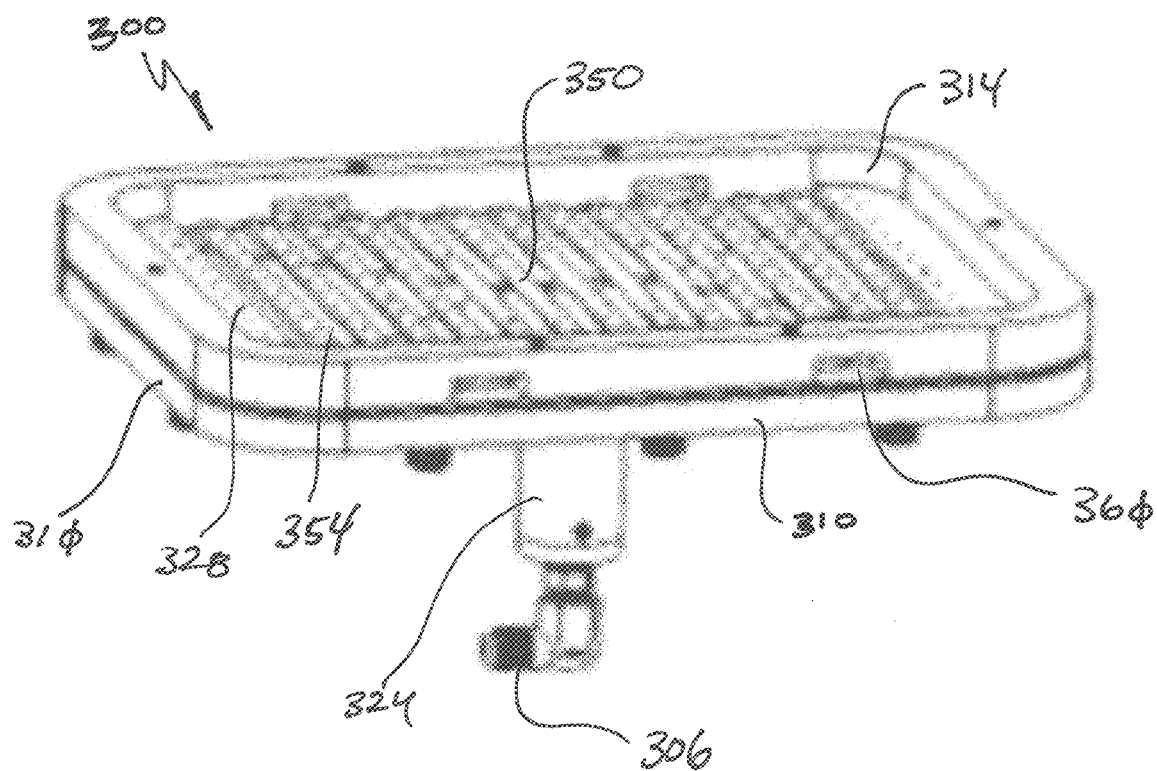
FIG. 26 is a perspective view of a flame burner of another embodiment of the present invention.

FIG. 26 shows a flame burner 300 of one embodiment of the present invention, generally comprised of a base plate 110 interconnected to a top plate 314 with a gasket therebetween. The gasket may be a two-piece, dovetailed, high temperature carbon gasket designed to prevent fuel leakage. The top plate 314 of one embodiment possesses a plurality of small, closely spaced orifices 328 that emit propane. This design builds a larger, brighter flame than designs with fewer, larger emitters. This top plate design also allows the flame to grow quite large without combusting excess fuel, unlike traditional burners that use large quantities of fuel to create large flames. The bottom plate accommodates a burner that creates a primary flame that is exhausted through the plurality of orifices 328. The top plate 314 may be non-planar, with ridges 350 at orifice locations and valleys 354 between adjacent orifices to direct water away from the propane emitters. The plate may also be sloped with a high point in the middle and provide gutters 360 at its perimeter edge to allow for efficient drainage so that the device operates normally after and during heavy rainfall.

Figure 27:
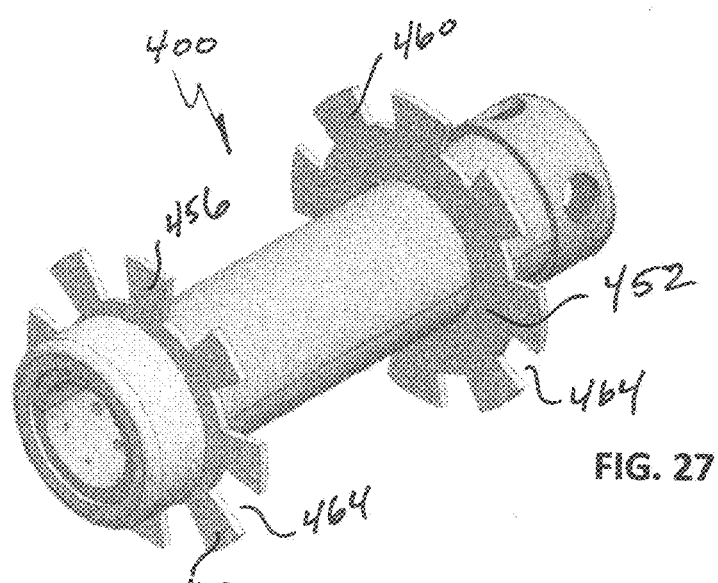
FIG. 27 is a perspective view of a burner employed by some embodiments of the present invention.
Figure 28:
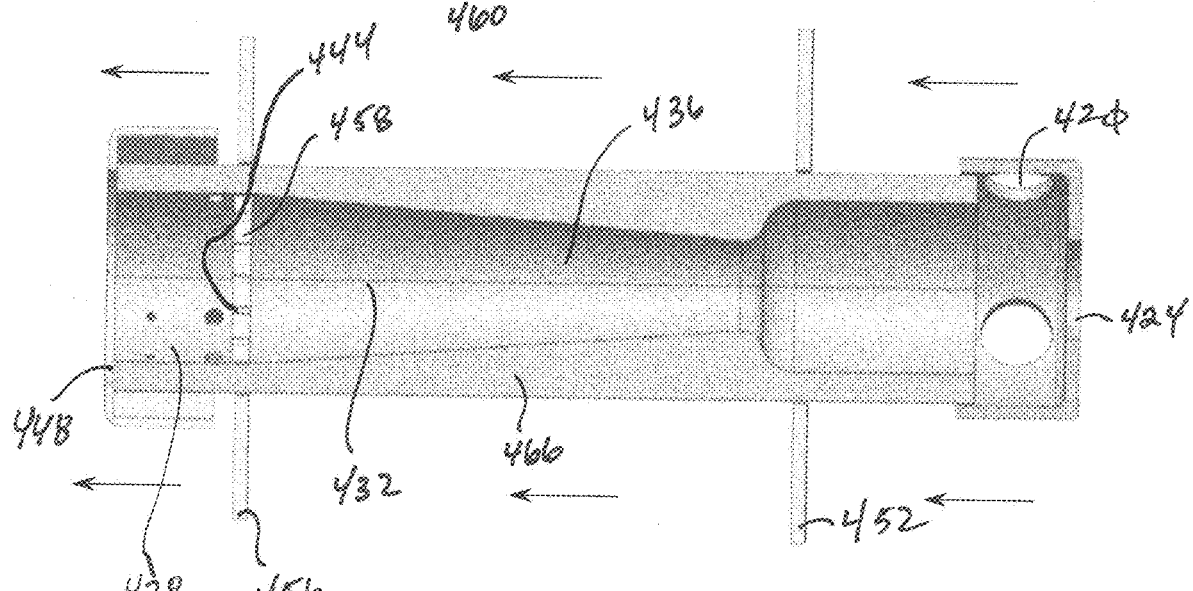
FIG. 28 is a cross-sectional view of FIG. 27.

FIGS. 27 and 28 show the gas jet 400 of another embodiment of the present invention comprised of a venturi 466 with at least one air inlet 420 and at least one fuel inlet 424 at one end and a combustion chamber 428 at the other. Here, the fuel inlet 424 comprises an opening generally aligned with a longitudinal axis 432 of the venturi adapted to receive a fuel probe. Fuel is expelled at the beginning of a fuel/air mixing zone 436, and outside air is drawn into an air inlet 420 and is accelerated by the venturi 466. The accelerated air mixes with the fuel injected into the fuel/air mixing zone 436. The fuel/air mix is then directed to the mesh burner 458, which has a plurality of burner ports 444, that ignites the mixture and expels a flame from a burner outlet 448.

The gas jet 400 of one embodiment has an intake baffle 452 and outlet baffle 356 that maintain the position of the gas jet 400 within the heating tube. The baffles comprise a series of vanes 460 that define openings 464 within each baffle that allow intake air to bypass the burner. The bypass air is heated by the combustion products exiting the burner. This heated air is directed through the heating tube to raise the temperature thereof and, thus, create radiant heat.

Again, the portable heating devices described herein provide convective heat from a flame exiting the heating tube. In one test conducted at an ambient temperature of about 18° F., radiant heat generated by the tube heater was about 644° F., and convective heat produced by the flame reached about 950° F. In another test conducted at 41.7° F., the radiant tube heat reached about 960° F., and flame-produced heat reached about 1070° F. One of ordinary skill in the art will appreciate that the efficiency of the described portable heaters is at least partially dependent on ambient temperature and pressure. For example, some embodiments of the present invention are designed to work more efficiently at a predetermined altitude, e.g., 6000-10,000 feet, wherein performance is diminished at higher altitudes. However, it is contemplated that comfortable heat could still be generated at higher altitudes using the concepts described herein.

Exemplary characteristics of embodiments of the present invention have been described. However, to avoid unnecessarily obscuring embodiments of the present invention, the preceding description may omit several known apparatus, methods, systems, structures, and/or devices one of ordinary skill in the art would understand are commonly included with the embodiments of the present invention. Such omissions are not to be construed as a limitation of the scope of the claimed invention. Specific details are set forth to provide an understanding of some embodiments of the present invention. It should, however, be appreciated that embodiments of the present invention may be practiced in a variety of ways beyond the specific detail set forth herein.

Modifications and alterations of the various embodiments of the present invention described herein will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. That is, the embodiments of the invention described herein are capable of being practiced or of being carried out in various ways. The scope of the various embodiments described herein is indicated by the following claims rather than by the foregoing description. And all changes which come within the meaning and range of equivalency of the claims are to be embraced within their scope. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The foregoing disclosure is not intended to limit the invention to the form or forms disclosed herein. In the foregoing Detailed Description, for example, various features of the invention are grouped together in one or more embodiments for the purpose of streamlining the disclosure. This method of disclosure is not to be interpreted as reflecting an intention that the claimed inventions require more features than expressly recited. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention. Further, the embodiments of the present invention described herein include components, methods, processes, systems, and/or apparatus substantially as depicted and described herein, including various sub-combinations and subsets thereof. Accordingly, one of skill in the art will appreciate that would be possible to provide for some features of the embodiments of the present invention without providing others. Stated differently, any one or more of the aspects, features, elements, means, or embodiments as disclosed herein may be combined with any one or more other aspects, features, elements, means, or embodiments as disclosed herein.

What is claimed is:

1. A portable heating device comprising:
   a tube heater having a first end accommodating a burner system and a second end;
   a flame burner positioned above the tube heater;
   wherein the burner system comprises a venturi with a gas jet at one end and a mesh burner at the other end, wherein fuel exiting the gas jet is accelerated through the venturi, thereby pulling in air through at least one opening in the burner system that is mixed with the fuel to create a fuel/air mixture that is ignited by the mesh burner; and
   wherein the mesh burner is comprised of a plurality of perforated layers, wherein each layer is rotated 15° from its neighboring layer.

2. The device of claim 1, wherein the burner system is devoid of a fan.

3. The device of claim 1, wherein the gas jet is configured to expel fuel having a pressure of about 5 psi.

4. The device of claim 1, wherein the tube heater includes at least one baffle extending from its inner surface.

5. The device of claim 1, wherein the second end of the tube heater is angled upwardly.

6. The device of claim 1, wherein the second end of the tube heater extends upwardly towards the flame burner and emits a flame.

7. The device of claim 1, wherein a first fuel delivery line is associated with the burner system and a second fuel delivery line is associated with the flame burner, and further comprising a second burner system associated with the second fuel delivery line.

8. The device of claim 1, wherein the tube heater is surrounded by a frame having a plurality of legs, wherein a top surface of the frame accommodates the flame burner.

9. The device of claim 8, wherein the frame possesses a plurality of tiedown locations configured to secure a fuel tank and/or secure the frame to a vehicle.

10. The device of claim 8, further comprising a wind guard selectively interconnected to the frame over the flame burner.

11. A heating device comprising:
    a tube heater comprised of a heating tube having a first end accommodating a burner system and a second end;
    a flame burner positioned adjacent to the tube heater; and
    wherein the second end of the heating tube is angled upwardly towards the flame burner and is configured to emit a flame.

12. The device of claim 11, wherein the tube heater is surrounded by a frame having a plurality of legs, wherein a top surface of the frame accommodates the flame burner.

13. The device of claim 11, wherein the burner system comprises a venturi with a gas jet at one end and a mesh burner at the other end.

14. The device of claim 13, wherein the mesh burner is comprised of at least two perforated layers, wherein each layer is rotated with respect to its neighboring layer to create a non-linear path through the mesh burner.

15. A heating device comprising:
    a tube heater comprised of a heating tube having a first end accommodating a burner system and a second end, the heating tube defining an inner extent of the tube heater, wherein the burner system comprises a venturi with a gas jet at one end and a mesh burner at the other end, wherein fuel exiting the gas jet is accelerated through the venturi, thereby pulling in air through at least one opening in the burner system;
    a flame burner positioned above the tube heater; and
    wherein the second end of the heating tube extends upwardly and emits a flame.

16. The device of claim 15, wherein the mesh burner is comprised of at least two perforated layers, wherein each layer is rotated about 15° from its neighboring layer.

* * * * *